United States Patent [19]

Shitara et al.

[11] Patent Number: 5,778,420
[45] Date of Patent: Jul. 7, 1998

[54] EXTERNAL STORAGE DEVICE AND EXTERNAL STORAGE CONTROL DEVICE WITH MEANS FOR OPTIMIZING BUFFER FULL/EMPTY RATIO

[75] Inventors: Masataka Shitara; Hideaki Tanaka, both of Kawasaki, Japan

[73] Assignee: Fujitsu Limited, Kawasaki, Japan

[21] Appl. No.: 608,336

[22] Filed: Feb. 28, 1996

[30] Foreign Application Priority Data

Feb. 28, 1995 [JP] Japan .................. 7-040238

[51] Int. Cl.$^6$ .................................... G06F 13/14
[52] U.S. Cl. .................. 711/113; 711/133; 395/877
[58] Field of Search .................. 395/250, 440, 395/872, 873, 876, 877; 711/113, 133

[56] References Cited

U.S. PATENT DOCUMENTS

| | | | |
|---|---|---|---|
| 5,210,829 | 5/1993 | Bitner | 395/250 |
| 5,412,780 | 5/1995 | Rushton | 395/250 |
| 5,603,058 | 2/1997 | Belknap et al. | 395/855 |

FOREIGN PATENT DOCUMENTS 4192156  7/1992  Japan.

*Primary Examiner*—Eddie P. Chan
*Assistant Examiner*—Kevin L. Ellis
*Attorney, Agent, or Firm*—Greer, Burns & Crain, Ltd.

[57] ABSTRACT

A control unit, such as an MPU in an external storage device or external storage control device, detects, on the basis of a Read or Write command, whether or not an internal reading or writing velocity is changed from one value to another value according to a zone of a storage medium. When the velocity is changed, the control unit calculates an optimal buffer full ratio or buffer empty ratio suitable for the velocity and sets the ratio in a data buffer control unit. Moreover, the control unit, such as an MPU, determines whether or not data requested by the Read or Write command resides over different zones in the storage medium. When the data resides over different zones, the control unit calculates one zone containing a majority of the requested data, works out an optimal buffer full ratio or buffer empty ratio according to a medium transfer rate associated with the zone, and sets the ratio in the data buffer control unit.

11 Claims, 14 Drawing Sheets

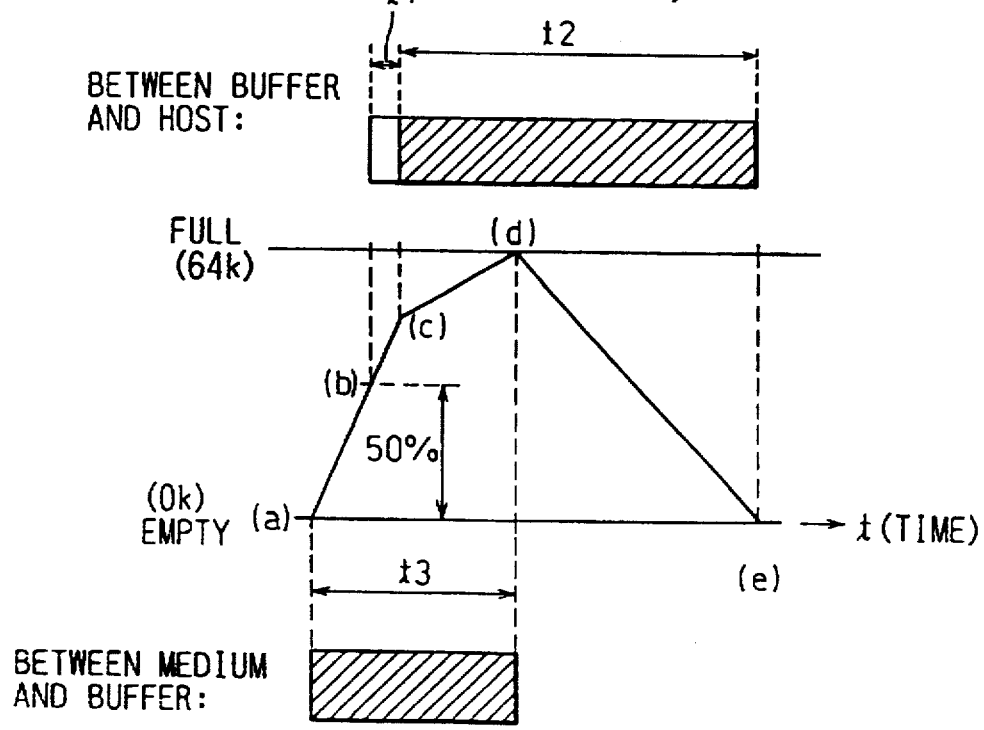

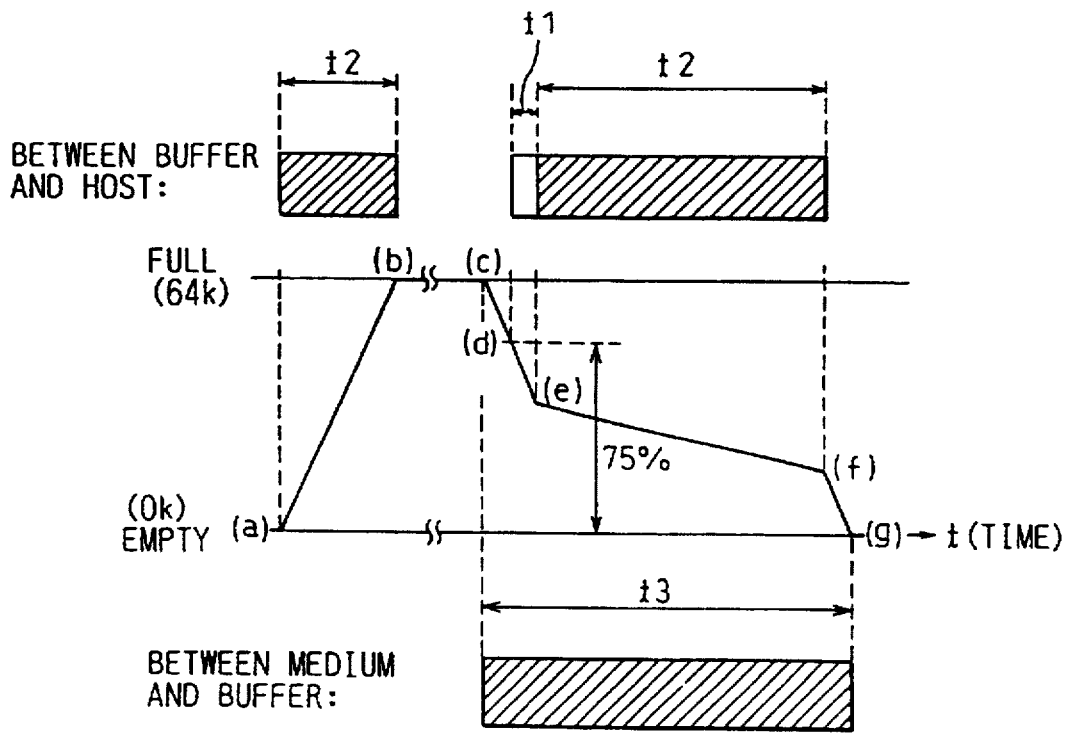

ZONE INFORMATION TABLE

```
                                        MEDIUM
                                        TRANSFER
                                        RATE(Mbps)
1st ZONE: BLOCK Nos.   0 TO  50000         6.0
2nd ZONE: BLOCK Nos.  50001 TO 100000      5.8
3rd ZONE: BLOCK Nos. 100001 TO 150000      5.4
4th ZONE: BLOCK Nos. 150001 TO 200000      5.2
5th ZONE: BLOCK Nos. 200001 TO 250000      5.0
6th ZONE: BLOCK Nos. 250001 TO 300000      4.8
```

Fig. 9B

PARAMETER DEFAULT VALUE TABLE

| STORAGE CAPACITY OF DATA BUFFER | 256kByte |
|---|---|
| BUFFER FULL RATIO | '80h' ('80/FF' = 50% ⇒ 32kByte) |
| BUFFER EMPTY RATIO | '80h' ('80/FF' = 50% ⇒ 32kByte) |
| NUMBER OF SEGMENT BUFFERS (SIZE BIT=0) | '04h' (64kByte) |

Fig. 9C

FIXED INFORMATION TABLE

| EFFECTIVE TRANSFER RATE OF DISK |
|---|
| TRANSFER RATE OF SCSI |
| REFERENCE VALUE FOR COMPARISON  FF=256 |
| LOGICAL DATA BLOCK LENGTH |
| TIME NECESSARY FOR RECONNECTION |

EXTERNAL STORAGE DEVICE AND EXTERNAL STORAGE CONTROL DEVICE WITH MEANS FOR OPTIMIZING BUFFER FULL/EMPTY RATIO

BACKGROUND OF THE INVENTION

1. Field of the Invention

The present invention relates to an external storage device, such as a magnetic disk unit or optical disk unit, that controls an interface conformable to the Small Computer Systems Interface (hereinafter "SCSI") standards and that has a data buffer for temporally storing transfer data for execution of a Read or Write command sent from a host (host unit), and to an external storage control device.

In recent years, a storage capacity of a data buffer has become larger and larger for the purpose of improving product performance, along with a progressive increase in storage capacity of a disk unit. In a method of controlling or operating a large-capacity data buffer, in principle, any of the commands defined under the SCSI standards pursuant to ANSI (American National Standards Institute) can be used for control. It is important how efficiently a segment buffer can be controlled.

2. Description of the Related Art

Referring to the appended drawings (FIGS. 1 to 4), the configuration and operations of a known magnetic disk unit will be described for better understanding of the problems occurring in a known external storage device.

FIGS. 1 to 4 are diagrams showing a known external storage device. In FIGS. 1 to 4, reference numeral 1 denotes a host (host unit). 2 denotes a magnetic disk unit. 3 denotes an interface control unit. 4 denotes a data buffer. 5 denotes a read/write control unit. 6 denotes a data buffer control unit. 7 denotes a read only memory (hereinafter "ROM"). 8 denotes a microprocessor unit (hereinafter "MPU"). 9 denotes a random access memory (hereinafter "RAM"). 10 denotes a drive (magnetic disk drive). 12 denotes a start address register. 13 denotes an end address register. 14 denotes a host pointer. 15 denotes a drive pointer. 16 denotes a full to empty ratio register.

Section 1

Description of a known magnetic disk unit (See FIG. 1)

FIG. 1 is a configuration diagram of a known magnetic disk unit. Based on FIG. 1, the configuration of the known magnetic disk unit will be described below.

A magnetic disk unit 2 includes an interface control unit 3, data buffer 4, read/write control unit 5, data buffer control unit 6, ROM 7, MPU 8, RAM 9, drive (magnetic disk drive) 10, and the like.

The data buffer control unit 6 includes a start address register 12, end address register 13, host pointer 14, drive pointer 15, full to empty ratio register, and the like.

During operation, the magnetic disk unit 2 is connected to the host 1. In this case, the host 1 and interface control unit 3 are linked by an SCSI-conformable cable.

The functions of the components in the magnetic disk unit 2 are as set forth below.

(1) The interface control unit 3 is a control unit for controlling various kinds of interface conforming to the SCSI standards.

(2) The data buffer 4 temporarily stores data to be transferred between a host and drive (storage medium). The data buffer 4 is divided into a plurality of segment buffers (i.e., sector buffers) for use.

(3) The read/write control unit 5 controls reading or writing of data from or to a storage medium (magnetic disk) within the drive 10.

(4) The data buffer control unit 6 controls a data buffer (controls data transfer or the like).

(5) The ROM 7 stores programs executed by the MPU and various kinds of data.

(6) The MPU 8 sends various kinds of control signals to internal portions of the magnetic disk unit.

(7) The RAM 9 is a memory to which access is made by the MPU and stores various kinds of work data or the like.

(8) The drive (magnetic disk drive) 10 includes a storage medium (magnetic disk), and reads or writes data from or to the storage medium.

(9) The start address register 12 stores a start address of a segment buffer currently used.

(10) The end address register 13 stores an end address of a segment buffer currently used.

(11) The host pointer 14 stores an address in a data buffer in which data transferred from a host or data to be transferred to the host is stored.

(12) The drive pointer 15 stores an address in a data buffer in which data to be transferred to a drive or data transferred from the drive is stored.

(13) The full to empty ratio register 16 stores a buffer full ratio or buffer empty ratio. When the magnetic disk unit is in operation, if a set value in the host pointer 14 or drive pointer 15 agrees with a set value (buffer full ratio or buffer empty ratio) in the full to empty ratio register 16, the data buffer control unit 6 issues an interrupt to the MPU 8.

In this case, for reading, the set value (buffer full ratio) in the full to empty ratio register 16 is compared with the value in the host pointer 14. For writing, the set value (buffer empty ratio) in the full to empty ratio register 16 is compared with the value in the drive pointer 15.

Section 2

Description of SCSI-conformable commands (1) Description of parameters

Under the SCSI standards, a Mode Select command (15$h$) and Mode Select Extended command (25$h$) are defined as arbitrary commands which are specified by the host 1. Here, 15$h$ and 25$h$ represent the number "15" and "25" in the hexadecimal notation, respectively. Three parameters transferred with the command are used to designate an operation of the data buffer. The parameters are as set forth below (1-1 to 1-3).

<1-1> Segment buffer size or the number of segment buffers

A method of splitting a data buffer falls into a method in which a storage capacity per segment buffer is specified for a parameter of "a segment buffer size," and a method in which how many segments a data buffer is divided into is specified for a parameter of "the number of segment buffers." These two data buffer splitting methods are designated according to the specification of a Size bit as follows:

Size bit=1: the parameter of "the number of segment buffers" is validated;

Size bit=0: the parameter of "a segment buffer size" is validated.

For example, the total storage capacity of a data buffer is 256 kilobyte (kByte). In this case, when the Size bit is set to 0, if 4 is specified for the number of segment buffers, a segment buffer size is 64 kilobyte that is calculated by dividing 256 kilobyte by 4. When the Size bit is set to 1, if 32 kilobyte is specified for a segment buffer size, the number of segment buffers is 8 that is calculated by dividing 256 kilobyte by 32 kilobyte.

<1-2> Buffer full ratio or buffer empty ratio

This parameter is used to specify the timing of starting a reconnection by using an interface with a host so as to start or restart data transfer to or from the host. With regard to a Read command, a parameter of "a buffer full ratio" is validated. With regard to a Write command, a parameter of a "a buffer empty ratio" is validated. Here, "reconnection" means that the magnetic disk unit 2 is again connected to the host 1 via the interface after the magnetic disk unit has been separated from the host device before the data transfer can be normally carried out.

Assuming that a value specified for the parameter of "a buffer full ratio or buffer empty ratio" is n, the specification value n ($0 \leq n \leq 256$) is used to express a "ratio of a segment buffer to a total storage capacity" that is "n/256." Herein, the total storage capacity of a data buffer shall be 256 kilobyte.

For example, the total storage capacity of a segment buffer is presumed to be 64 kilobyte. In this case, if the "buffer full ratio" is 40$h$ (the number "40" denoted in the hexadecimal notation when a Read command is designated), the reconnection is started according to the timing that read data whose amount is comparable to 25% (=40/FF) of the total storage capacity of the segment buffer has been stored.

If the "buffer empty ratio" is CO$h$ (when a Write command is designated), the reconnection is started according to the timing that write data whose amount is comparable to 75% (=CO/FF) of the total storage capacity of the segment buffer has been output.

<1-3> Disk bit (Page 8, Byte2, Bit4: discontinuity)

This bit specifies a process which is to be executed when a Track Switch or Cylinder Switch is activated during reading-ahead (the Track Switch prompts a switching operation of heads).

In the case of Disk bit=0, this bit suspends reading-ahead immediately before the activation of a Track Switch or Cylinder Switch. In the case of Disk bit=1, this bit allows reading-ahead to continue but does not care about a Track Switch or Cylinder Switch.

(2) Description of reading-ahead (Read Ahead Cache function)

Reading-ahead is a kind of process in which, after data is read from a block requested by a Read command sent from a host, data is read from subsequent blocks in advance (irrespective of an instruction sent from the host).

Owing to the process, when another Read command is issued from a host in order to access a subsequent block, the magnetic disk unit can transfer data from a segment buffer to the host without any access to the drive.

Section 3

Description of parameter processing or the like in the magnetic disk unit

In the prior art, parameters (set values) employed in a method of controlling or operating a data buffer include "default values" that are initial values the magnetic disk unit has, and "current values (or save values)" modified by a host.

With regard to a particular method for specifying parameters under the SCSI standards, the parameters (which will be used as "current values" or "save values") to be transferred with a Mode Select command or Mode Select Extended command are described below. The host 1 can modify a certain parameter value into any other value at the time of transfer of these parameters.

As long as no parameter value is transferred, the magnetic disk unit 2 uses a "default value." Once a certain parameter value is transferred, the specified value is used as a top priority.

A parameter concerning a segment buffer, which is specified with the Mode Select command, includes a Page 2 parameter (parameter set in page 2). The Page 2 parameter is described as "02 OE nn mm 00 00 . . . (00 continues till the fifteenth byte)."

In the Page 2 parameter, "nn" specifies a buffer full ratio, and "mm" specifies a buffer empty ratio. Hereinafter, an operation invoked with the specification of the "buffer full ratio or buffer empty ratio" will be described with particular values set temporarily.

In the description below, 256 kilobyte, 80$h$ (80/FF=50%), CO$h$ (CO/FF=75%), and 04$h$ are set as an example of set values for the capacity of a data buffer, buffer full ratio n, buffer empty ratio m, and the number of segment buffers, respectively.

Section 4

Description of splitting a segment buffer (See FIGS. 2A and 2B)

FIG. 2A is a diagram for explaining the configuration of a known data buffer. FIG. 2B is a diagram for explaining a known technique of controlling a segment buffer.

According to the foregoing example, 04$h$ is specified for the number of segment buffers (Size bit=0). Each segment buffer is therefore a quarter of a data buffer as shown in FIG. 2A.

To be more specific, since the total storage capacity of a data buffer is 256 kilobyte, 256 kilobyte is divided by 4. Consequently, each segment buffer (Seg.Buff#0, Seg.Buff#1, Seg.Buff#2, or Seg.Buff#3) has a storage capacity of 64 kilobyte.

For putting any of the segment buffers to use, the data buffer control unit 6 is, as shown in FIG. 2B, provided with the start address register 12, end address register 13, host pointer 14, drive pointer 15, and full to empty ratio register 16.

A value in the start address register 12 indicates a start address of a segment buffer currently used. A value in the end address register 13 indicates an end address of a segment buffer currently used.

A value in the host pointer 14 indicates an address in which data to be transferred from the host 1 to the drive is stored. A value in the drive pointer 15 indicates an address in which data to be transferred from the drive 10 to the host 1 is stored.

A value in the full to empty ratio register 16 indicates a full or empty ratio. During operation, when a value in the host pointer 14 or drive pointer 15 agrees with a value in the full to empty ratio register 16, the data buffer control unit 6 issues an interrupt to the MPU 8.

Section 5

Description of an operation performed with execution of a Read command (See FIG. 3)

FIG. 3 is an explanatory diagram concerning a known Read command operation. Based on FIG. 3, an operation performed with an execution of a Read command will be described below. In FIG. 3, t1 denotes reconnection time necessary for a reconnection process, t2 denotes data buffer-to-host data transfer time necessary for transferring data between a data buffer and a host, t3 denotes storage medium (magnetic disk)-to-data buffer data transfer time necessary for transferring data between a storage medium and a data buffer.

"Full" means that data a data buffer is full. "Empty" means that data in the data buffer is empty. (a) to (e) mentioned below indicates the processing order.

(a) In this state, it is started to transfer data read from a storage medium within the disk drive 10 into the data buffer 4 and store the data in the data buffer 4 (storage medium-to-data buffer data transfer is started).

(b) A reconnection process is started in order to transfer data to the host 1, according to the timing that an amount of data stored in the data buffer 4 reaches a value meeting a specified buffer full ratio of 50%.

(c) After the reconnection process is completed, data transfer to or from the host 1 is started (data buffer-to-host data transfer is started).

(d) Reading data from the storage medium within the disk drive 10 is completed.

(e) Data transfer to or from the host 1 is completed.

Section 6

Description of an operation performed with execution of a Write command (See FIG. 4)

FIG. 4 is an explanatory diagram concerning a known Write command operation. Based on FIG. 4, an operation performed with execution of a Write command will be described below. In FIG. 4, t1 denotes reconnection time, t2 denotes data buffer-to-host data transfer time, t3 denotes storage medium (magnetic disk)-to-data buffer data transfer time.

"Full" means that data in a data buffer is full, while "Empty" means that data in the data buffer is empty. (a) to (g) denotes the processing order.

(a) After receiving a Write command, the MPU 8 analyzes the command. As soon as the MPU 8 becomes aware that the command is a Write command, it starts transferring write data from the host 1 (host-to-data buffer data transfer is started). At this time, it is started to store the data transferred from the host 1 in the data buffer 4.

(b) If a segment buffer becomes full of the write data during data transfer between the host and data buffer, a disconnection is executed under the control of the MPU 8. At this time, the drive 10 is executing a head positioning process in preparation for a write operation.

(c) The head positioning process is completed duly, and then data transfer from the data buffer 4 to the drive 10 is started. Writing a storage medium within the drive 10 is then started.

(d) A reconnection process is started in order to receive data from the host 1 according to the timing that an amount of data stored in the data buffer 4 reaches a value meeting a specified buffer empty ratio of 75%.

(e) After the reconnection process is completed, data transfer to or from the host 1 is started. At this time, data transfer between the data buffer and the host is started.

(f) Data transfer to or from the host 1 is completed.

(g) Writing data in the storage medium within the drive 10 is completed.

The aforesaid known magnetic disk unit has the following problems:

A "default value" set at a factory before delivery or a "current value" designated by a customer at a host is set unilaterally as a value of a "buffer full ratio or buffer empty ratio."

After being determined, the value is usually used without any change. That is to say, the value remains constant irrespective of a variation (in the number of connected units, the ability of a host to transfer data, the number of data requests, or the like) depending on an individual system environment employed, or a variation (a rate in which the unit is in busy state, amount of data to be transferred, access area, a frequency of access, access mode, or the like) depending on the contents of a job or the job time.

For this reason, even if the storage capacity of a data buffer is increased, no advantage is obtained and a product performance is not fully attained. In other words, if the value of a "buffer full ratio or buffer empty ratio" remains constant, for example, when the rate of data transfer between a data buffer and a drive is raised during data writing, an amount of data to be transferred from the data buffer to the drive increases. An amount of data in the data buffer therefore diminishes. This leads to a data underrun state in which data stored in the data buffer is not more than a predetermined amount.

As mentioned above, if the value of a "buffer full ratio or buffer empty ratio" remains constant, an error such as a data underrun state or data overrun state occurs at worst. Eventually, there arises a possibility that a disk rotation wait state is induced to deteriorate a device performance.

SUMMARY OF THE INVENTION

The present invention is made in consideration of the aforesaid problems. An object of the present invention is to provide an external storage device and external storage control device in which an optimal value of a parameter used to control each segment buffer can be automatically set internally so that an excellent device performance can be attained.

For accomplishing the above object, an external storage device of the present invention comprises a control unit for controlling the device internally, a drive for reading or writing data from or to a storage medium, and a data buffer for temporarily storing data to be transferred between a host and the storage medium. The control unit sets a value of a buffer full ratio or buffer empty ratio used to determine the timing of starting a reconnection by using a host interface, and starts the reconnection on the basis of the thus set value so as to duly start data transfer between the host and the external storage device.

Herein, the control unit includes a means for detecting a change of a velocity and setting parameters that detects on the basis of a received Read or Write command, whether or not an internal reading or writing velocity for a storage medium is changed from one value to another value, and that, when detecting that the velocity is changed, calculates an optimal buffer full ratio or buffer empty ratio suitable for the velocity and sets the ratio internally.

Preferably, an external storage device of the present invention comprises an MPU for controlling the device internally, a drive for reading or writing data from or to a storage medium, a data buffer for temporarily storing data to be transferred between a host and the storage medium, and a data buffer control unit for controlling the data buffer. The MPU sets data of a buffer full ratio or buffer empty ratio, which is used to determine the timing of starting a reconnection by using a host interface, in the data buffer control unit, and starts the reconnection on the basis of the thus set data so as to duly start data transfer between the host and the external storage device under the control of the data buffer control unit.

Herein, the MPU includes a means for detecting a change of a velocity and setting parameters that detects, on the basis of a received Read or Write command, whether or not an internal reading or writing velocity is changed from one value to another value, and that, when detecting that the velocity is changed, calculates an optimal buffer full ratio or buffer empty ratio suitable for the velocity and sets the ratio in the data buffer control unit.

Preferably, an external storage device of the present invention comprises an MPU for controlling the device internally, a drive for reading or writing data from or to a storage medium, a data buffer for temporarily storing data to be transferred between a host and the storage medium, and a data buffer control unit for controlling the data buffer. The MPU sets data of a buffer full ratio or buffer empty ratio, which is used to determine the timing of starting a reconnection by using a host interface, in the data buffer control unit, and starts the reconnection on the basis of the thus set data so as to duly start data transfer between a host and the external storage device under the control of the data buffer.

Herein, the MPU includes a means for determining a zone and setting parameters that determines whether or not data requested by a received Read or Write command resides over different zones in a storage medium, and that, when determining that the data resides over different zones, calculates one zone containing a majority of the requested data, works out an optimal buffer full ratio or buffer empty ratio according to a medium transfer rate associated with the zone, and sets the ratio in the data buffer control unit.

Preferably, an external storage device of the present invention comprises an MPU for controlling the device internally, a drive for reading or writing data from or to a storage medium, a data buffer for temporarily storing data to be transferred between a host and the storage medium, and a data buffer control unit for controlling the data buffer. The MPU sets data of a buffer full ratio or buffer empty ratio, which is used to determine the timing of starting a reconnection by using a host interface, in the data buffer control unit, and starts the reconnection on the basis of the thus set data so as to duly start data transfer between a host and the external storage device under the control of the data buffer control unit.

Herein, the MPU includes a means for measuring a data transfer rate and setting parameters that measures a data transfer rate between the host and the external storage device at every reception of a command, compares the rate with an internal medium transfer rate, calculates an optimal buffer full ratio or buffer empty ratio according to a variation of the data transfer rate between the host and the external storage device, and then sets the ratio in the data buffer control unit.

Preferably, an external storage device of the present invention comprises an MPU for controlling the device internally, a drive for reading or writing data from or to a storage medium, a data buffer for temporarily storing data to be transferred between a host and the storage medium, and a data buffer control unit for controlling the data buffer. The MPU sets data of a buffer full ratio or buffer empty ratio, which is used to determine the timing of starting a reconnection by using a host interface, in the data buffer control unit, and starts the reconnection on the basis of the thus set data so as to duly start data transfer between the host and the external storage device under the control of the data buffer control unit.

Herein, the MPU includes a means for comparing a data transfer rate with a medium transfer rate and setting parameters that compares a data transfer rate between the host and the external storage device with an internal medium transfer rate, and that, when the medium transfer rate is higher, specifies zero for the buffer full ratio or buffer empty ratio and sets zero in the data buffer control unit.

Preferably, the storage medium in the external storage device of the present invention adopts a constant density recording (hereinafter abbreviated as "CDR" that will be described in detail) mode in which the whole recording area of a storage medium is divided into a plurality of zones (i.e., cylinders) in a radial direction and the recording bit density for every zone is made constant for recording data on the storage medium.

On the other hand, an external storage control device of the present invention includes a control unit for controlling the device internally. The control unit sets a value of a buffer full ratio or buffer empty ratio used to determine the timing of starting a reconnection by using a host interface, and starts the reconnection on the basis of the thus set value so as to duly start data transfer between the host and the external storage device.

Herein, the control unit includes a means for detecting a change of a velocity and setting parameters that detects, on the basis of a received Read or Write command, whether or not a reading or writing velocity for a storage medium set internal portions of an external storage device is changed from one value to another value, and that, when detecting that the velocity is changed, calculates an optimal buffer full ratio or buffer empty ratio suitable for the velocity and sets the ratio internally.

In an external storage device of the present invention, for example, when an internal reading or writing velocity (medium transfer rate) is changed from one value to another value according to a zone of a storage medium, an optimal buffer full ratio or buffer empty ratio is automatically set. Based on the set value, a reconnection of a bus is started so that control of data transfer between a host and the external storage device will be started accordingly.

According to the external storage device of the present invention, an optimal buffer full ratio or buffer empty ratio can be set all the time. The problems of the known device will not arise, and data transfer can be achieved efficiently.

On the other hand, when receiving a Read or Write command issued from a host, a control unit in an external storage control device of the present invention detects, on the basis of the command, whether or not a data transfer rate between a data buffer and the storage medium is varied depending on a zone of the storage medium in use.

When detecting that the data transfer rate is varied depending on a zone, the control unit calculates an optimal buffer full ratio or buffer empty ratio suitable for the data transfer rate, and sets the ratio internally.

As a result, according to the external storage control device of the present invention, when a medium transfer rate is varied depending on a zone, an optimal buffer full ratio or buffer empty ratio can be set for efficient data transfer.

BRIEF DESCRIPTION OF THE DRAWINGS

The above object and features of the present invention will be more apparent from the following description of the preferred embodiments with reference to the accompanying drawings, wherein:

FIG. 3 is a diagram for explaining a known Read command operation;

FIG. 4 is a diagram for explaining a known Write command operation;

FIGS. 9A to 9C are diagrams for explaining information set in a ROM in the first preferred embodiment of the present invention;

DESCRIPTION OF THE PREFERRED EMBODIMENTS

Hereinafter, a detailed description regarding preferred embodiments of the present invention will be given with reference to FIGS. 5 to 14.

Figure 1:
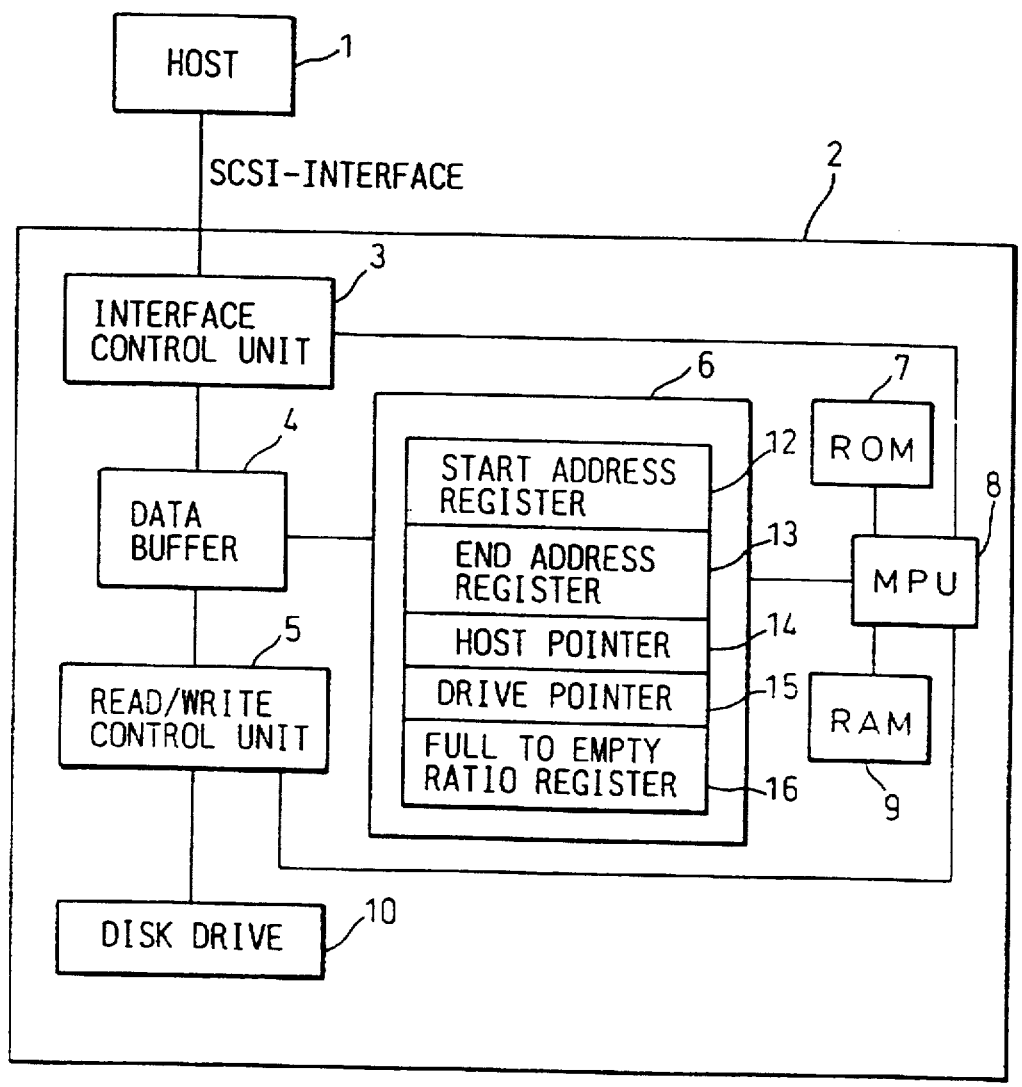
FIG. 1 is a block diagram showing a known external storage device.
Figure 2A:
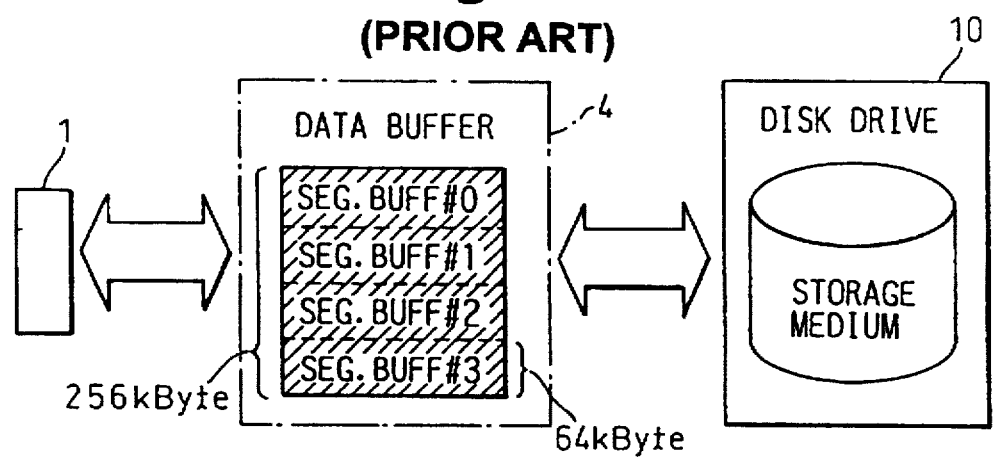
FIG. 2A is a diagram for explaining the configuration of a known data buffer.
Figure 2B:
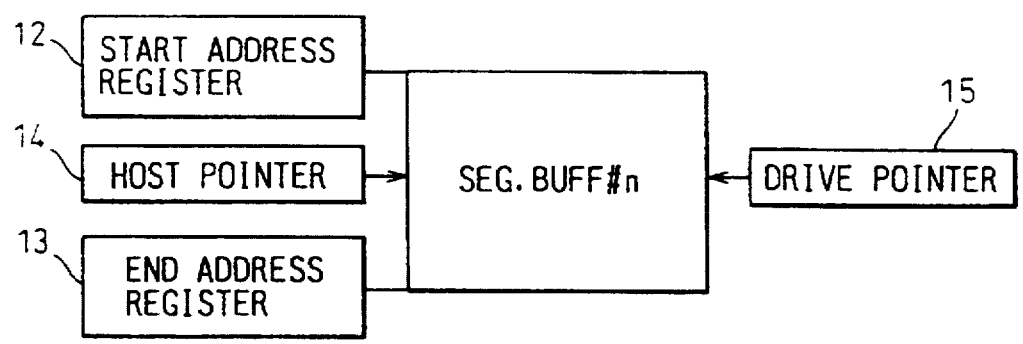
FIG. 2B is a diagram for explaining a known technique of controlling a segment buffer.
Figure 5:
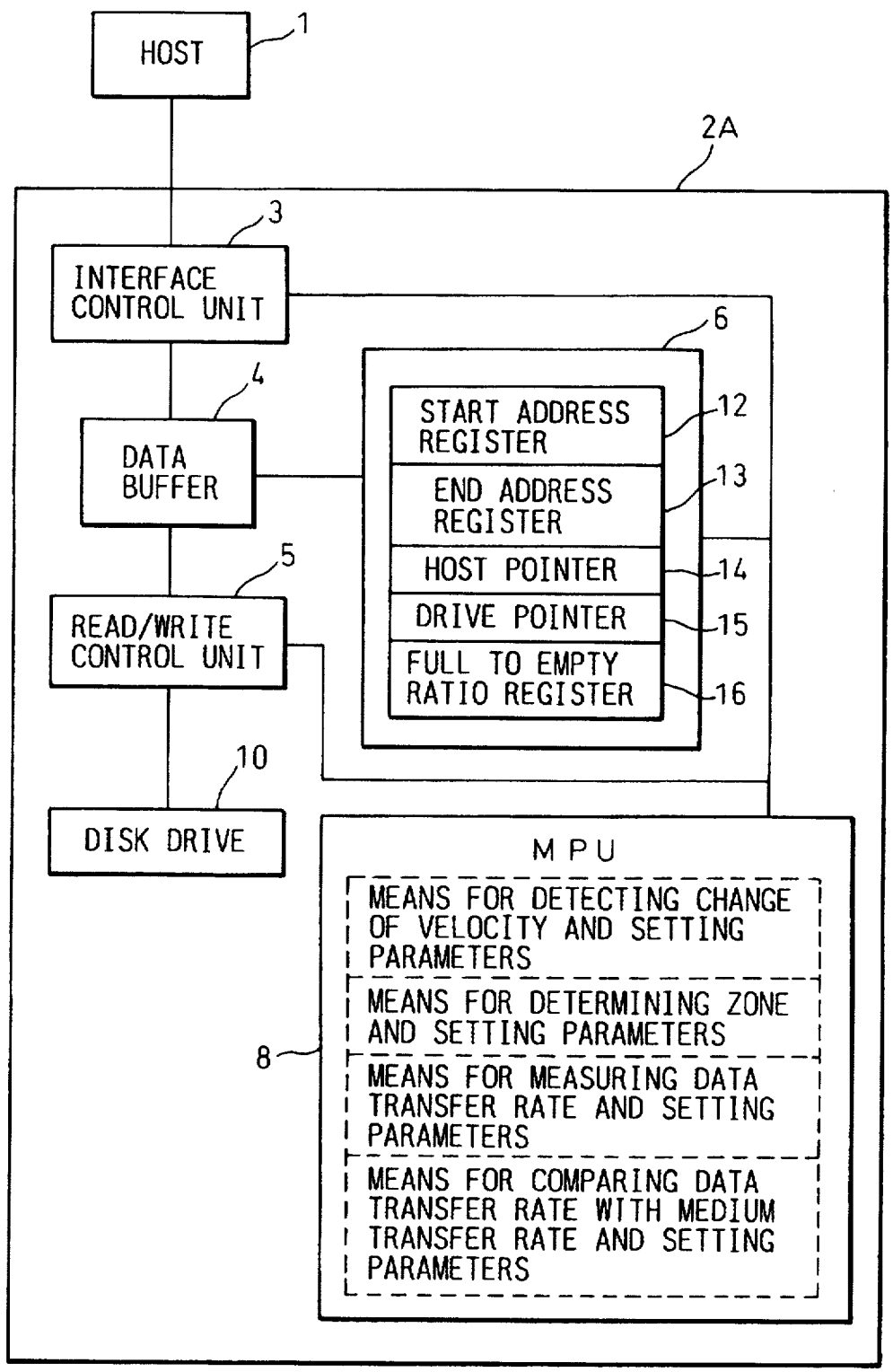
FIG. 5 is a block diagram showing the configuration of an embodiment based on a first principle of the present invention.
Figure 6:
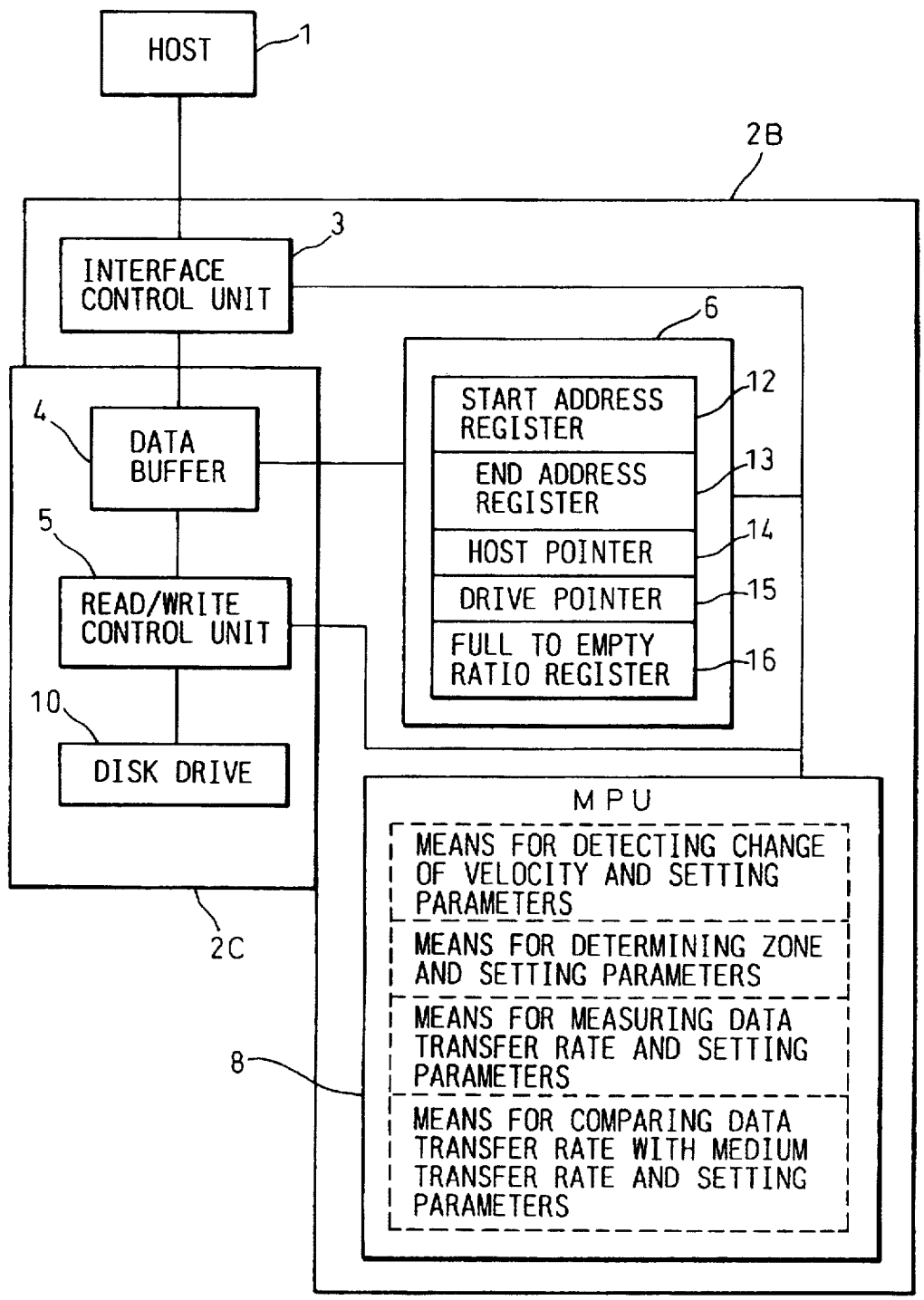
FIG. 6 is a block diagram showing the configuration of an embodiment based on a second principle of the present invention.

FIG. 5 is a block diagram showing the configuration of an embodiment based on a first principle of the present invention. FIG. 6 is a block diagram showing the configuration of an embodiment based on a second principle of the present invention. Herein, an external storage device and external storage control device are configured as described below in an effort to solve the aforesaid problems.

(1) As shown in FIG. 5, an external storage device 2A comprises an interface control unit 3, data buffer 4, read/ write control unit 5, drive 10, data buffer control unit 6, and MPU 8.

The data buffer control unit 6 includes a start address register 12, end address register 13, host pointer 14, drive pointer 15, and full to empty ratio register 16. The MPU 8 includes a means for detecting a change of a velocity and setting parameters, a means for determining a zone and setting parameters, a means for measuring a data transfer rate and setting parameters, and a means for comparing a data transfer rate with a medium transfer rate and setting parameters.

The external storage device is configured as follows:

(2) An external storage device comprises a control unit for controlling the device internally, a drive 10 for reading or writing data from or on a storage medium, and a data buffer 4 for temporarily storing data to be transferred between a host and the storage medium, wherein the control unit sets a buffer full ratio or buffer empty ratio used to determine the timing of starting a reconnection by using a host interface, and starts the reconnection on the basis of the set value so as to duly start data transfer between the host and the external storage device. In this external storage device, the control unit includes a means for detecting a change of a velocity and setting parameters that detects, on the basis of a received Read or Write command, whether or not an internal reading or writing velocity (medium transfer rate) for a storage medium is changed from one value to another value, and that, when detecting that the velocity is changed, calculates an optimal buffer full ratio or buffer empty ratio suitable for the velocity and sets the ratio internally.

(3) An external storage device comprises an MPU 8 for controlling the device internally, a drive 10 for reading or writing data from or on a storage medium, a data buffer 4 for temporarily storing data to be transferred between a host and the storage medium, and a data buffer control unit 6 for controlling the data buffer 4, wherein the MPU 8 sets a buffer full ratio or buffer empty ratio, which is used to determine the timing of starting a reconnection by using a host interface, in the data buffer control unit 6, and starts the reconnection on the basis of the set value so as to duly start data transfer between the host and the external storage device. In this external storage device, the MPU 8 includes a means for detecting a change of a velocity and setting parameters that detects, on the basis of a received Read or Write command, whether or not an internal reading or writing velocity (medium transfer rate) for a storage medium is changed from one value to another value, and that, when detecting that the velocity is changed, calculates an optimal buffer full ratio or buffer empty ratio suitable for the medium transfer rate and sets the ratio in the data buffer control unit.

(4) An external storage device comprises an MPU 8 for controlling the device internally, a drive 10 for reading or writing data from or to a storage medium, a data buffer 4 for temporarily storing data to be transferred between a host and the storage medium, and a data buffer control unit 6 for controlling the data buffer 4, wherein the MPU 8 sets a buffer full ratio or buffer empty ratio, which is used to determine the timing of starting a reconnection by using a host interface, in the data buffer control unit 6, and starts the reconnection on the basis of the set data so as to duly start data transfer between the host and the external storage device under the control of the data buffer control unit. In this external storage device, the MPU 8 includes a means for determining a zone and setting parameters that determines whether or not data requested by a received Read or Write command resides over different zones in a storage medium, and that, when the data resides over different zones, calculates one zone containing a majority of the requested data, works out an optimal buffer full ratio or buffer empty ratio according to a medium transfer rate associated with the zone, and sets the ratio in the data buffer control unit.

(5) An external storage device comprises an MPU 8 for controlling the device internally, a drive 10 for reading or writing data from or to a storage medium, a data buffer 4 for temporarily storing data to be transferred between a host and the storage medium, and a data buffer control unit 6 for controlling the data buffer 4, wherein the MPU 8 sets a buffer full ratio or buffer empty ratio, which is used to determine the timing of starting a reconnection by using a host interface, in the data buffer control unit 6, and starts the reconnection on the basis of the set data so as to duly start data transfer between the host and the external storage device under the control of the data buffer control unit. In this external storage device, the MPU 8 includes a means for measuring a data transfer rate and setting parameters that measures a data transfer rate between the host and the external storage device at every reception of a command, compares the rate with an internal medium transfer rate, calculates an optimal buffer full ratio or buffer empty ratio according to a variation of the data transfer rate between the host and the external storage device, and then sets the ratio in the data buffer control unit.

(6) An external storage device comprises an MPU 8 for controlling the device internally, a drive 10 for reading or writing data from or to a storage medium, a data buffer 4 for temporarily storing data to be transferred between a host and the storage medium, and a data buffer control unit 6 for controlling the data buffer 4, wherein the MPU 8 sets a buffer full ratio or buffer empty ratio, which is used to determine the timing of starting a reconnection by using a host interface, in the data buffer control unit 6, and starts the reconnection on the basis of the set data so as to duly start data transfer between the host and the external storage device under the control of the data buffer control unit. In this external storage device, the MPU 8 includes a means for comparing a data transfer rate with a medium transfer rate and setting parameters that compares a data transfer rate between the host and the external storage device with an internal medium transfer rate, and that, when the data transfer rate between the data buffer and storage medium is higher, specifies zero for the buffer full ratio or buffer empty ratio and sets zero in the data buffer control unit.

(7) The storage medium in the drive 10 adopts a CDR mode in which the whole recording area of a storage medium is divided into a plurality of zones in a radial direction and the recording bit density per zone is made constant for recording data on the storage medium.

(8) As shown in FIG. 6, an external storage control device 2B includes a control unit (for example, MPU 8) for controlling the device internally, wherein the control unit sets a buffer full ratio or buffer empty ratio used to determine the timing of starting a reconnection by using a host interface, and starts the reconnection on the basis of the set value so as to duly start data transfer between a host and the external storage device. In the external storage control device 2B, the control unit includes a means for detecting a change of a velocity and setting parameters that detects, on the basis of a received Read or Write command, whether or not a reading or writing velocity for a storage medium set in internal portions of an external storage device 2C is changed from one value to another value, and that, when detecting that the velocity is changed, calculates an optimal buffer full ratio and buffer empty ratio suitable for the velocity and sets the ratio internally.

The features of the present invention deriving from the foregoing configuration will be described in conjunction with FIGS. 5 and 6.

In FIG. 5, in an external storage device, when an internal reading or writing speed (medium transfer rate) is changed from one value to another value according to a zone of a storage medium, an optimal buffer full ratio or buffer empty ratio is set automatically. A reconnection of a bus is started according to the set value in order to duly start control of data transfer between a host and the external storage device.

In this reconnection process, first, when the host 1 issues a command, the interface control unit 3 receives the command and sends an interrupt to the MPU 8 so as to notify the MPU 8 of the reception of a command. When receiving the notification of the command reception with the interrupt, the MPU 8 receives the command from the interface control unit 3 and analyzes the received command.

If it is found, as a result of the command analysis, that the received command is a Read command or Write command, the MPU 8 compares data requested by the command with internal information so as to check to which zone of a storage medium within the drive 10 the requested data belongs.

If it is found, as a result of the comparison, that the requested data is data residing in the same zone as an internally set zone, the Read or Write command is executed as it is. Even if the requested data resides in a zone different from an internally set zone, as long as a medium transfer rate is the same, the Read or Write command is executed as it is.

However, when the requested data is data residing in a zone different from the internally set zone, if the reading or writing velocity is changed from one value to another value according to the zone, the MPU 8 calculates a new buffer full ratio or buffer empty ratio.

After calculating a new buffer full ratio or buffer empty ratio as mentioned above, the MPU 8 sets the value in the full to empty ratio register 16 in the data buffer control unit 6, and then executes the Read or Write command.

Owing to the foregoing process, in the case in which a medium transfer rate is varied depending on a zone, an optimal buffer full ratio or buffer empty ratio can be set for efficient data transfer.

For example, assuming that the value of a buffer full ratio or buffer empty ratio remains constant as it is in the known device, when a data transfer rate between a data buffer and a drive becomes higher during, for example, data writing, an amount of data transferred from the data buffer to the drive increases. Consequently, an amount of data in the data buffer decreases. This leads to a data underrun state.

As mentioned above, when the value of a buffer full ratio or buffer empty ratio remains constant, an error such as a data underrun or data overrun occurs at worst. Eventually, there arises a possibility that a disk rotation wait state is induced to deteriorate device performance.

However, according to the present invention, since an optimal buffer full ratio or buffer empty ratio can be set all the time, the foregoing problems existing in the known device will not occur. Data transfer can be achieved efficiently.

Moreover, when receiving a Read or Write command issued from a host, a control unit detects, on the basis of the command, whether or not a data transfer rate between a data buffer and storage medium is varied depending on a zone of a storage medium.

When detecting that the data transfer rate is varied depending on the zone, the control unit calculates an optimal buffer full ratio or buffer empty ratio suitable for the data transfer rate and sets the ratio internally.

Owing to the foregoing process, in the case in which a medium transfer rate is varied depending on a zone, an optimal buffer full ratio or buffer empty ratio can be set for efficient data transfer.

Moreover, when receiving a Read or Write command, the MPU 8 detects, on the basis of the Read or Write command, whether or not a medium transfer rate (data transfer rate between a data buffer and storage medium) is varied depending on a zone of a storage medium.

When detecting that the medium transfer rate is varied depending on the zone, the MPU 8 calculates an optimal buffer full ratio or buffer empty ratio suitable for the data transfer rate and sets the value of the ratio in the full to empty ratio register 16 in the data buffer control unit 6.

Owing to the foregoing process, in the case in which a medium transfer rate is varied depending on a zone, an optimal buffer full ratio or buffer empty ratio can be set for efficient data transfer.

Furthermore, the MPU 8 determines whether or not data requested by the received Read or Write command resides over different zones (e.g., adjoining zones) in the storage medium. If it is found as a result that the data resides over different zones, the number of the zone containing a majority of the requested data is calculated.

The MPU 8 then calculates an optimal buffer full ratio or buffer empty ratio according to a data transfer rate associated with the calculated zone and sets the value of the ratio in the full to empty ratio register 16 in the data buffer control unit 6. Owing to this process, even when requested data resides over different zones, an optimal buffer full ratio or buffer empty ratio can be set accordingly.

Furthermore, the MPU 8 measures a data transfer rate between the host and the external storage device at every reception of a command, compares the rate with an internal medium transfer rate, and then calculates an optimal buffer full ratio or buffer empty ratio according to a variation of the data transfer rate between the host and the external storage device. The MPU 8 then sets the calculated value in the full to empty ratio register 16 in the data buffer control unit 6.

Owing to the foregoing process, even if a data transfer rate between a host and the external storage device is varied, an optimal buffer full ratio or buffer empty ratio can be set.

Furthermore, the MPU 8 compares a data transfer rate between the host and external storage device with an internal medium transfer rate (data transfer rate between a data buffer and storage medium). When the medium transfer rate is higher than the data transfer rate between the host and the external storage device, zero is specified for the buffer full ratio or buffer empty ratio. Zero is then set in the full to empty ratio register 16 in the data buffer control unit 6. Owing to this process, the time necessary at the end of the command can be minimized.

Moreover, the storage medium in the drive 10 is a storage medium adopting a CDR mode in which the whole recording area of a storage medium is divided into a plurality of zones in a radial direction and a recording bit density per zone is made constant for recording. The medium transfer rate therefore varies depending on the zone of the medium in use.

Nevertheless, since the external storage device sets an optimal buffer full ratio or buffer empty ratio all the time, an excellent device performance can be attained.

On the other hand, in FIG. 6, when receiving a Read or Write command issued from the host 1, the control unit in the external storage control device 2B detects, on the basis of the command, whether or not the data transfer rate between the data buffer 4 and storage medium is varied depending on the zone of the storage medium in use.

After detecting that the data transfer rate is varied depending on the zone, the control unit calculates an optimal buffer full ratio or buffer empty ratio suitable for the data transfer rate and sets the ratio internally.

Owing to the foregoing process, in the case in which a medium transfer rate is varied depending on the zone, an optimal buffer full ratio or buffer empty ratio can be set for efficient data transfer.

As mentioned above, an optimal value of a parameter for use in controlling each segment buffer can be automatically set internally. An optimal buffer full ratio or buffer empty ratio can thus be set all the time, whereby a data underrun or data overrun state can be prevented for efficient data transfer.

Preferred embodiments of the present invention will be described in conjunction with the drawings. FIGS. 7 to 14 are diagrams showing embodiments of the present invention. In FIGS. 7 to 14, components identical to those in FIGS. 1 to 6 are assigned the same reference numerals. Reference numeral 20 denotes a timer.

Section 1

Figure 7:
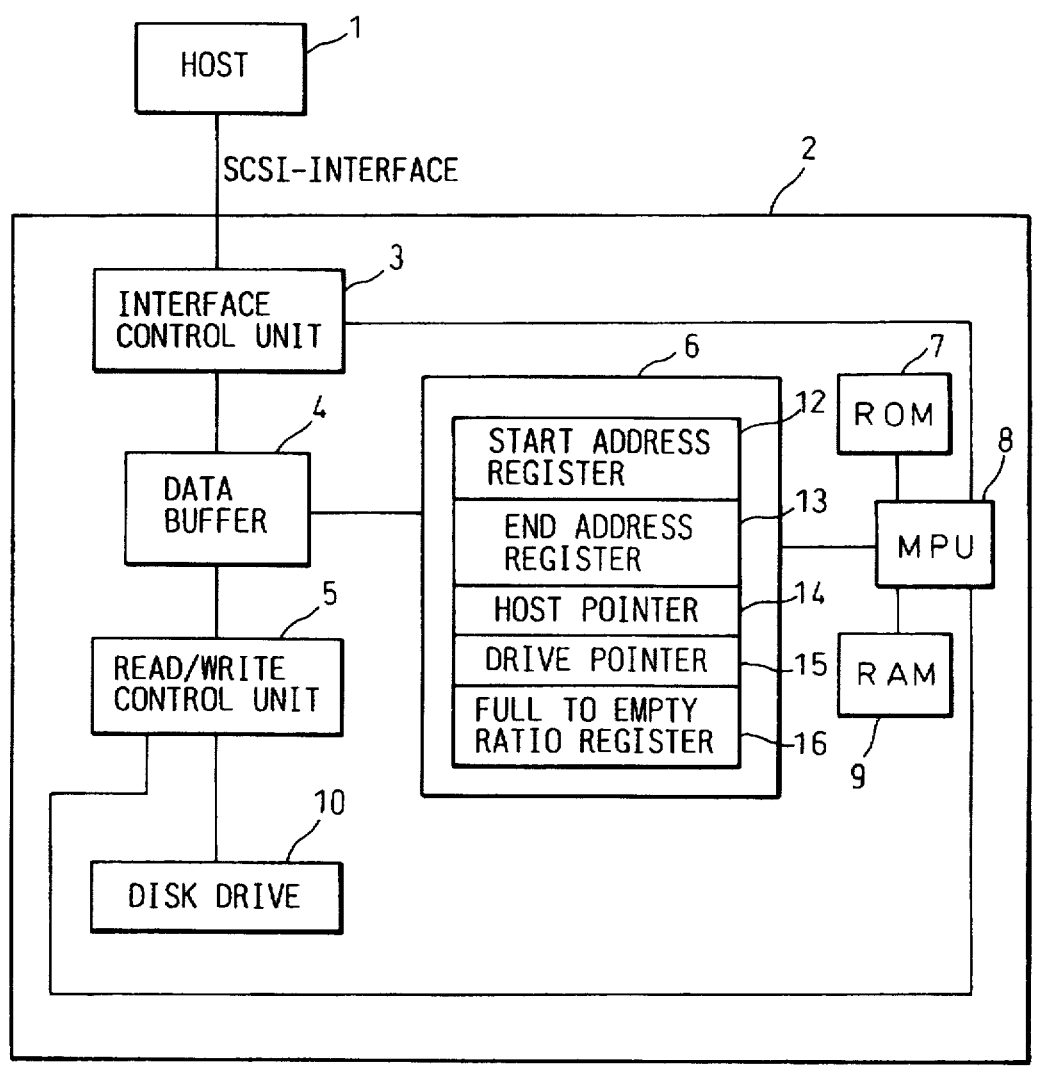
FIG. 7 is a block diagram showing the configuration of a device of a first preferred embodiment of the present invention.

Description of a device of a first preferred embodiment of the present invention (See FIG. 7)

FIG. 7 is a block diagram showing the configuration of a device of a first preferred embodiment of the present invention. Based on FIG. 7, the configuration of a magnetic disk unit of the first embodiment will be described.

The magnetic disk unit 2 includes an interface control unit 3, data buffer 4, read/write control unit 5, data buffer control unit 6, ROM 7, MPU 8, RAM 9, and drive (magnetic disk drive) 10, and the like.

The data buffer control unit 6 includes a start address register 12, end address register 13, host pointer 14, drive pointer 15, full to empty ratio register 16, and the like.

During operation, the magnetic disk unit 2 is connected to the host 1. In this case, the host 1 and interface control unit 3 are linked by an SCSI-conformable cable.

The functions of the components are as set forth below.

(1) The interface control unit 3 controls an interface conforming to the SCSI standards.

(2) The data buffer 4 temporarily stores data to be transferred between the host and the drive (storage medium).

(3) The read/write control unit 5 controls reading or writing of data from or to a storage medium.

(4) The data buffer control unit 6 controls a data buffer (data transfer control or the like).

(5) The ROM 7 stores programs used by the MPU 8 and various kinds of data.

(6) The MPU 8 gives various kinds of control in the magnetic disk unit 2.

(7) The RAM 9 is a memory to which access is made by the MPU 8 and stores various kinds of work data.

(8) The drive (magnetic disk drive) 10 includes a storage medium (magnetic disk) and reads or writes data from or to the storage medium.

(9) The start address register 12 stores a start address of a segment buffer currently used.

(10) The end address register 13 stores an end address of a segment buffer currently used.

(11) The host pointer 14 stores an address in a data buffer in which data transferred from a host or data to be transferred to the host is stored.

(12) The drive pointer 15 stores an address in the data buffer 4 in which data to be transferred to the drive 10 or data transferred from the drive 10 is stored.

(13) The full to empty ratio register 16 stores a full or empty ratio.

When the unit is in operation, if a set value in the host pointer 14 or drive pointer 15 agrees with a set value (buffer full ratio or buffer empty ratio) in the full to empty ratio register 16, the data buffer control unit 6 issues an interrupt to the MPU 8.

In this case, for reading, the set value (buffer full ratio) in the full to empty ratio register 16 is compared with the value in the host pointer 14. For writing, the set value (buffer empty ratio) in the full to empty ratio register 16 is compared with the value in the drive pointer 15.

Section 2

Figure 8:
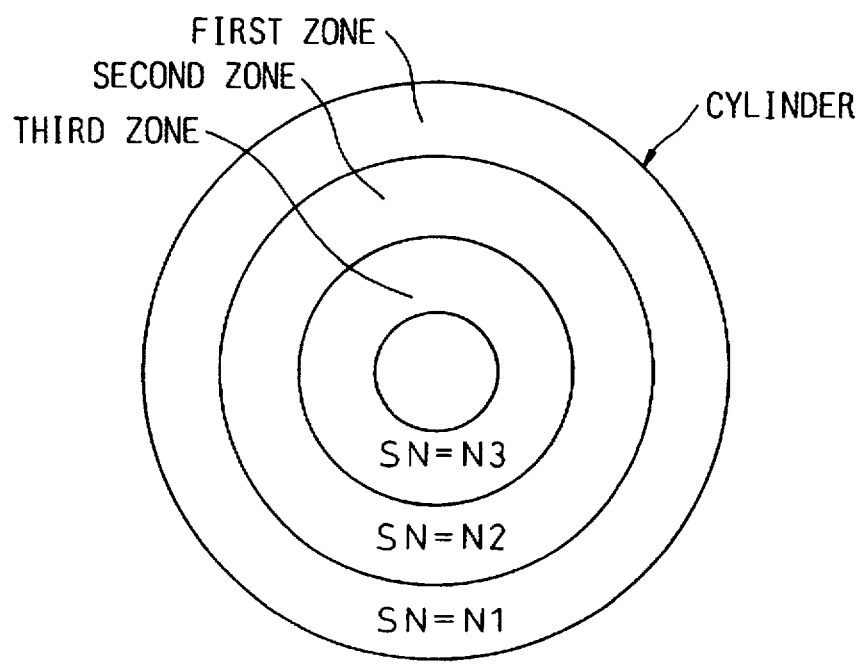
FIG. 8 is a diagram for explaining a CDR mode employed in the first preferred embodiment.

Description of a CDR (Constant Density Recording) mode (See FIG. 8)

FIG. 8 is an explanatory diagram concerning the CDR mode. The magnetic disk unit adopts the CDR mode for recording data on a storage medium. The summary of the CDR mode is as set forth below.

In a sector-type magnetic disk unit, each track (i.e., zone or cylinder) of a storage medium (magnetic disk) is divided into a plurality of sections that are referred to as sectors. Data is written or read in units of a sector.

In the storage medium (magnetic disk), the radius of each cylinder (or track) becomes larger from the inner circumferential portion of the storage medium toward the outer circumferential portion thereof. When the storage medium rotates, a relative velocity (velocity of circumferential movement) in relation to a head differs from cylinder to cylinder. In other words, the speed is lower on the inner circumferential portion of the storage medium and becomes higher and higher in a direction toward the outer circumferential portion thereof. Compared with the inner circumferential portion of the storage medium, the outer circumferential portion thereof has therefore a lower recording bit density (a larger bit length).

For example, as shown in FIG. 8, the whole recording area is divided into a plurality of zones (first zone, second zone, and third zone) in a radial direction (the whole recording area is actually divided into a larger number of zones).

A mode, in which a recording process is performed by varying the number of sectors depending on a zone (first zone, second zone, or third zone) and thus a recording density is made constant, has been conceived. This recording mode is referred to as a CDR mode.

In this case, for example, a zone on the outermost circumferential portion is regarded as a first zone, a zone inside the first zone is regarded as a second zone, and a zone on the innermost circumferential portion is regarded as a third zone. When the number of sectors SN in each zone is N1 for the first zone, N2 for the second zone, and N3 for the third zone, the numbers of sectors are determined so that they have the relationship of N1>N2>N3.

In other words, the number of sectors is increased from the inner circumferential portion of the storage medium toward the outer circumferential portion thereof. Thus, a constant recording bit density (bit length) can be attained. This leads to an increase in overall storage capacity.

As mentioned above, in a magnetic disk unit adopting the CDR mode, a data transfer rate for reading or writing is different between the inner circumferential of the storage medium and the outer circumferential portion thereof. That is to say, a data transfer rate between a data buffer and storage medium varies depending on an object zone (cylinder zone) of a storage medium. When the present invention applies to this kind of unit, a remarkable effect can be exerted.

Section 3

Description of an example of a data table in a ROM (See FIGS. 9A, 9B, and 9C)

FIGS. 9A to 9C are explanatory diagrams concerning information set in a ROM. To be more specific, FIG. 9A is a diagram showing a zone information table, FIG. 9B is a diagram showing a parameter default value table, and FIG. 9C is a diagram showing a fixed information table.

In the ROM, programs to be run by the MPU 8 are stored or various information is pre-set. Various tables, such as those shown in FIGS. 9A to 9C, are stored as the set information.

(1) Description of a zone information table

An example of a zone information table shown in FIG. 9A stores such data items as zones (cylinder zones) of a storage medium (magnetic disk), and associated block numbers (data block numbers) and medium transfer rates in the form of table data. The medium transfer rate refers to a data transfer rate between the data buffer 4 and the storage medium within the drive 10. The zones correspond to cylinder zones shown in FIG. 8.

According to the example of a zone information table, the first zone is associated with block numbers 0 to 50,000 and a medium transfer rate of 6.0 Mbps (Megabits per sec.). The second zone is associated with block numbers 50,001 to 100,000 and a medium transfer rate of 5.8 Mbps.

The foregoing data constituting a zone information table is stored on the basis of pre-measured data. Using this zone information, when a Read command or Write command issued from the host 1 is received, it can be determined on the basis of a block number of data requested by the command to which zone the requested data belongs. Once a zone is identified, a medium transfer rate becomes apparent.

For example, when a data block number is 49,999, requested data is data belonging to the first zone. When a data block number is 50,009, requested data is data belonging to the second zone. When a data block number is 150,001, requested data is data belonging to the fourth zone.

(2) Description of a parameter default value table

A parameter default value table shown in FIG. 9B is pre-set as standard values in a ROM.

In the example of a parameter default value table, the storage capacity of a data buffer is 256 kilobyte, a buffer full ratio is 80$h$ (80/FF=50% that is 32 kilobyte), a buffer empty ratio is 80$h$ (80/FF=50% that is 32 kilobyte), and the number of segment buffers (Size bit=0) is 04$h$ (64 kilobyte).

(3) Description of a fixed information table

A fixed information table as shown in FIG. 9C is set in the ROM. The MPU 8 reads the table data for use during operation.

For example, such data items as an effective transfer rate of a disk, SCSI-conformable transfer rate, reference value for comparison (FF=256), logical data block length, time for a reconnection, and the like are set in the table.

Section 4

Figure 10:
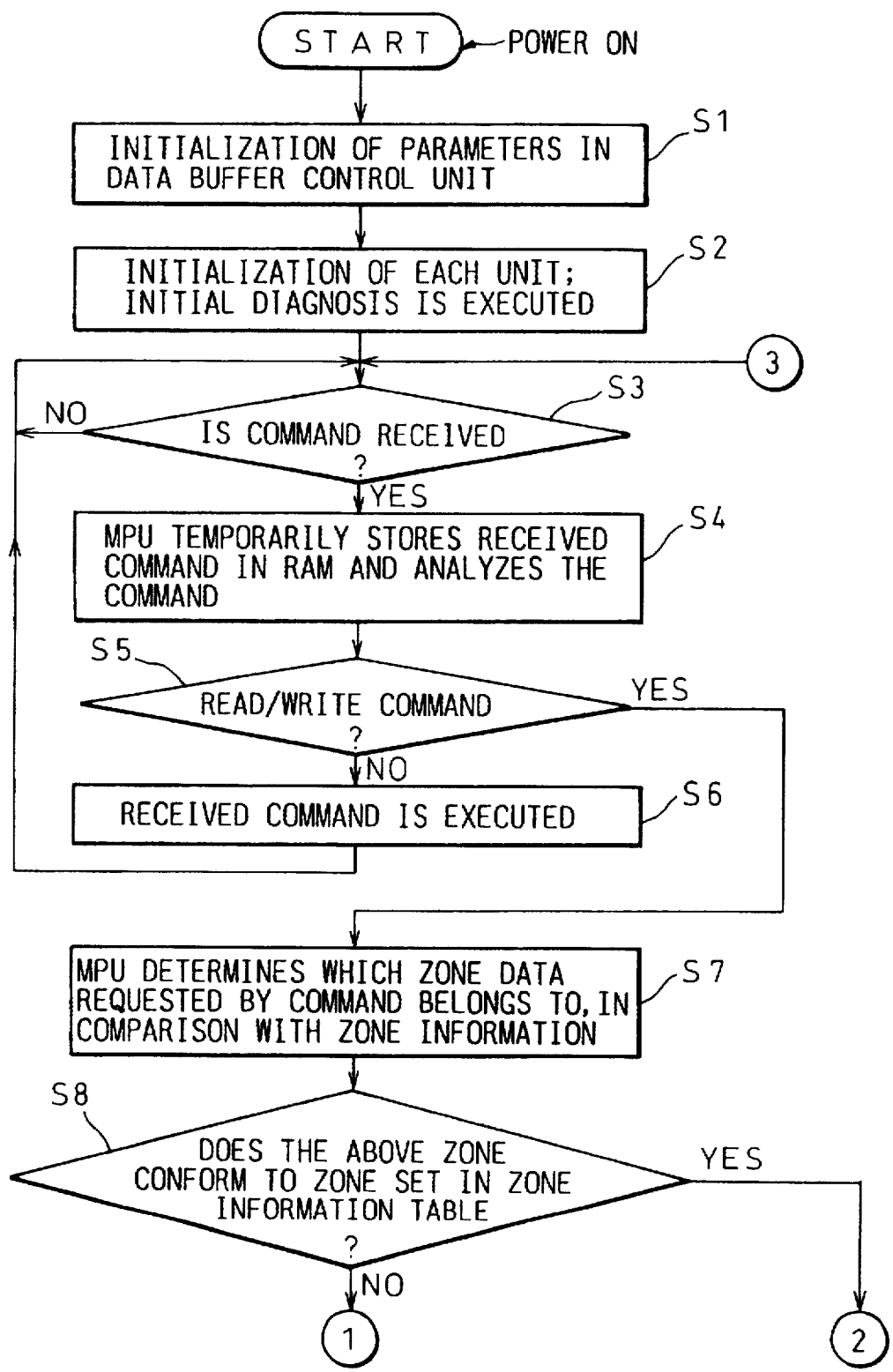
FIG. 10 is a first half of a flowchart describing a procedure employed in the first preferred embodiment of the present invention (part 1)
Figure 11:
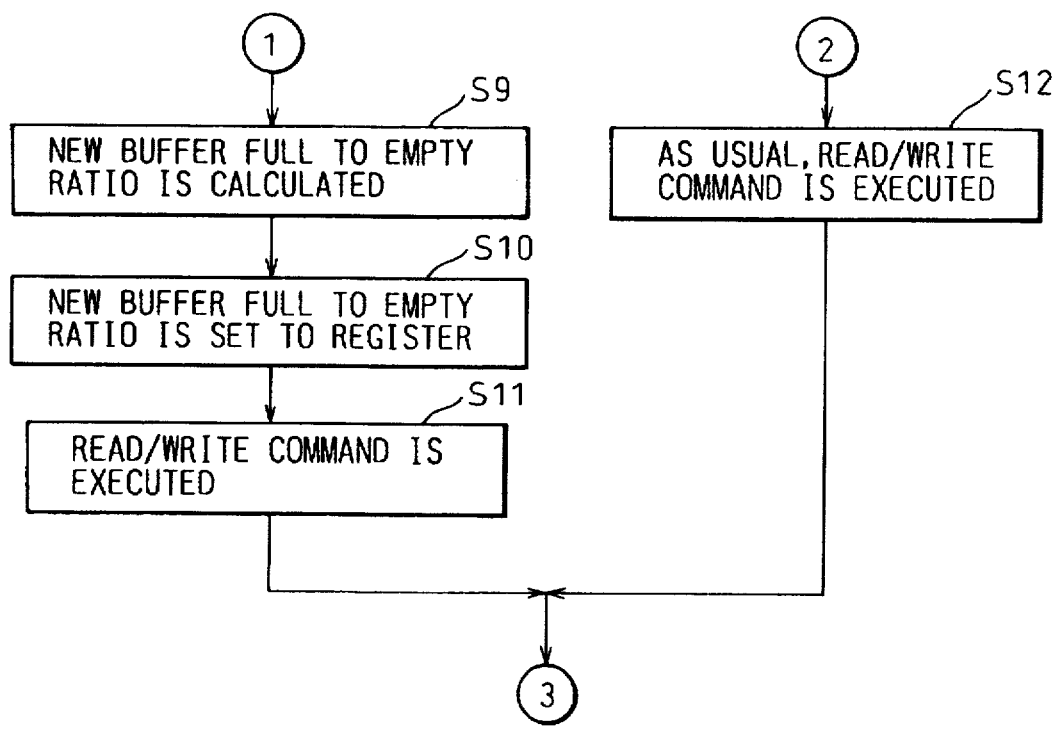
FIG. 11 is a second half of the flowchart describing the procedure employed in the first preferred embodiment of the present invention (part 2)

Description of operations of the first embodiment in conjunction with a flowchart (See FIGS. 10 and 11)

FIG. 10 is the first half of a flowchart describing a procedure employed in the first preferred embodiment of the present invention (part 1). FIG. 11 is the second half of the flowchart describing the procedure employed in the first preferred embodiment of the present invention (part 2). The procedure employed in the first embodiment of the present invention will be described in conjunction with FIGS. 10 and 11. S1 to S12 denote processing steps.

In the process of the first embodiment, in the case in which an internal reading or writing velocity is varied depending on a zone of a storage medium, an optimal buffer full ratio or buffer empty ratio is set automatically. According to the set value, a reconnection of a bus is started.

As shown in FIG. 10, when the power supply of the magnetic disk unit is turned on, first, the MPU 8 sends parameters for initialization to the data buffer control unit 6, sets the parameters in the data buffer control unit 6, and thus carried out initialization (S1). In this case, the MPU 8 reads table data stored in the ROM 7, transfers parameters based on the read data to the data buffer control unit 6, and thus carried out initialization. A default value is set in the full to empty ratio register 16 for initialization.

The MPU 8 then initializes the interface control unit 3, read/write control unit 5, and RAM 9. The MPU 8 performs initial diagnosis internally so as to check the validity of circuitry (S2).

After completing the process of step S2, the MPU 8 enters a command-reception wait state to wait until a command sent from the host 1 is received (S3). When the host 1 issues a command in this state, the interface control unit 3 receives the command and issues an interrupt to the MPU 8 so as to notify the MPU 8 of the fact that a command is received.

When receiving the notification of command reception with an interrupt, the MPU 8 receives the command from the interface control unit 3, temporarily stores the command in the RAM 9, and thus saves the command. The MPU 8 then analyzes the received command (S4).

If it is found, as a result of the command analysis, that the received command is neither a Read command nor a Write command (S5), the received command is executed (S6). Control is then returned to step S3.

On the contrary, if the command is a Read command or Write command (S5), the MPU 8 performs comparison so as to determine to which zone of the storage medium the data requested by the command belongs (S7).

In this case, the MPU 8 reads zone information from the information setting table (See FIG. 9A) in the ROM 7 so as to execute comparison. For example, when the leading character of the block number of the requested data is 0, the data resides in the first zone.

If it is found, as a result of the comparison, that the requested data is data belonging to the same zone as an internally set zone (S8), as shown in FIG. 11, the Read or Write command is executed as it is conventionally (S12). However, when the requested data is data belonging to a zone different from a set zone, the MPU 8 calculates a new buffer full or empty ratio (S9).

In this case, the MPU 8 references the information (data) in the ROM 7, and calculates a new buffer full or empty ratio according to an expression presented below in line with a medium transfer rate for a zone in which the data requested by the command resides (1-1 and 1-2).

<1-1> General expression giving a buffer full ratio (amount of transfer data/effective transfer rate of disk) x (BFR/256)≦(amount of transfer data/effective transfer rate of disk)−(amount of transfer data/SCSI-conformable transfer rate)−(time necessary for reconnection)

In the above expression, BFR denotes a buffer full ratio. The SCSI-conformable transfer rate is a rate (Mbps) agreed with a host in advance. The effective transfer rate of a disk is an effective value (Mpbs) of a medium transfer rate that varies depending on a zone. The amount of transfer data is an amount of data (byte) requested by a Read command. The time necessary for reconnection is a time that is required for reconnection.

Data items read from the ROM 7 are used as the SCSI-conformable transfer rate, effective transfer rate of a disk, and time necessary for reconnection.

<1-2> General expressions giving a buffer empty ratio

General expressions giving a buffer empty ratio are as follows:

X≧ effective transfer rate of disk x {(logical data block length/SCSI-conformable transfer rate)+(time necessary for reconnection)}

$$BER \leq 256 - 1X/256t$$

where BER denotes a buffer empty ratio, and 1X/256t means that the result of calculation quotient of X/256 is rounded up. The logical data block length is the number of bytes constituting one logical data block. The SCSI-conformable transfer rate is a rate (Mbps) agreed with a host in advance. The transfer rate of a disk is an effective value (Mbps) of a medium transfer rate that varies depending on a zone. The time necessary for reconnection is the time (in microseconds) required for carrying out a reconnection process.

After calculating a new buffer full ratio or buffer empty ratio as mentioned above, the MPU 8 stores the value in the RAM 9. Thereafter, the MPU 8 sets the data stored in the RAM 9 in the full to empty ratio register 16 in the data buffer control unit 6 (S10). The MPU 8 then executes a Read or Write command (S11), and returns control to step S3.

Owing to the aforesaid process, even when a medium transfer rate varies depending on a zone, an optimal buffer full ratio or buffer empty ratio can be set for efficient data transfer.

Section 5

Figure 12:
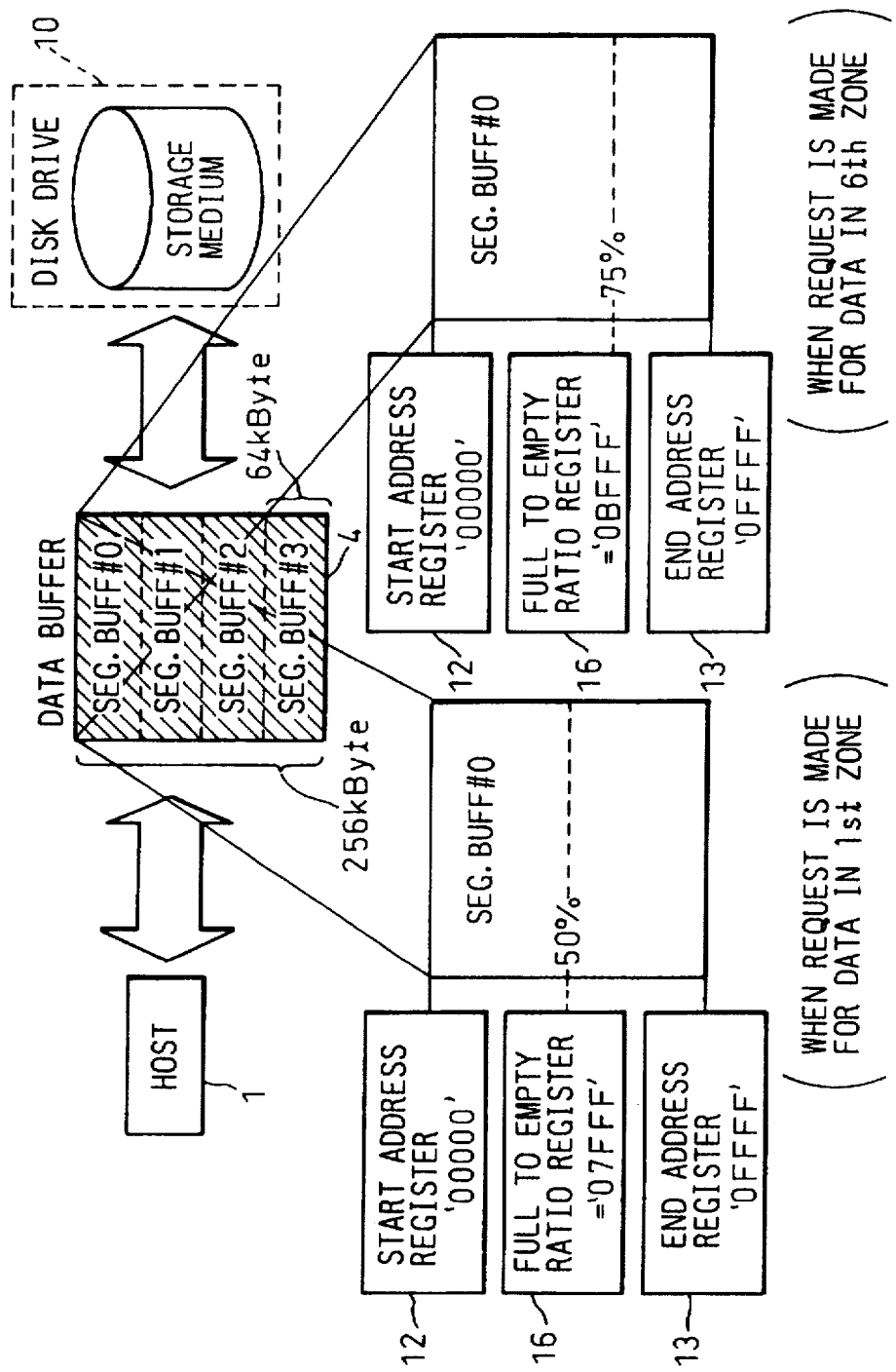
FIG. 12 is a diagram for explaining more particularly an operation employed in the first preferred embodiment of the present invention.

Description of operations of the first embodiment in conjunction with examples (See FIG. 12)

FIG. 12 is a diagram for specifically explaining operations of the first preferred embodiment of the present invention. Based on the FIG. 12, the operations of the first embodiment will be described using examples (1̂ 2̂).

1̂ A first type of example is an example in which data in the first zone of a storage medium within the drive 10 is requested by a Read or Write command issued from the host 1. In this example, the MPU 8 calculates a buffer full ratio or buffer empty ratio according to the aforesaid expression or expressions. Consequently, a full or empty ratio "07FFF" (=50%) shall be set (in reality, a buffer full ratio and buffer empty ratio are calculated independently using the aforesaid expression or expressions. In this example, however, both the full and empty ratios shall have the same value for brevity's sake).

A start address "00000" is set in the start address register 12, and an end address "0FFFF" is set in the end address register 13.

When a Read command is executed in the above state, the process is such that: first, the interface control unit 3 disconnects a host interface (conforming to the SCSI standards) under the control of the MPU 8, and then starts transferring data read from the storage medium within the drive 10 to the data buffer 4 for storage.

Thereafter, the interface control unit starts a reconnection by using the host interface under the control of the MPU 8 so as to transfer data to the host 1 according to the timing that an amount of data stored in the data buffer 4 reaches a value meeting the buffer full ratio of 50%.

After a reconnection process is completed, data transfer to or from the host 1 is started under the control of the data buffer control unit 6 (data buffer-to-host data transfer is started). Thereafter, reading data from the storage medium within the drive is completed. Data transfer to or from the host 1 is then completed.

When a Write command is executed, the process is such that: after receiving a Write command, the MPU 8 analyzes the command; and then as soon as the MPU identifies a Write command, the MPU 8 starts transferring write data from the host 1 (host-to-data buffer data transfer is started). At this time, storing data transferred from the host in the data buffer 4 is started.

Thereafter, when a segment buffer becomes full of the write data during the host-to-data buffer data transfer, the interface control unit 3 disconnects the host interface (conformable to the SCSI standards) under the control of the MPU 8. At this time, the drive 10 is a executing head positioning process for preparation of writing.

The head positioning process is duly completed. Data transfer from the data buffer 4 to the drive 10 is then started, and writing in the storage medium within the drive 10 is started. The interface control unit 3 then starts a reconnection by using the host interface (conforming to the SCSI standards) under the control of the MPU 8 so as to receive data from the host 1 according to the timing that an amount of data stored in the data buffer 4 reaches a value meeting the specified buffer empty ratio of 50%.

After a reconnection process is thus completed, data transfer to or from the host 1 is started. In this case, data transfer between the data buffer and host is started. Thereafter, data transfer to or from the host 1 is completed, and then writing data in the storage medium within the drive 10 is completed.

2 A second type of example is an example in which data in the sixth zone is requested by a Read or Write command sent from a host. In this example, the MPU 8 calculates a buffer full ratio or buffer empty ratio according to the aforesaid expression or expressions. Assuming that a full or empty ratio "0BFFF" (=75%) is set (in reality, the buffer full ratio and buffer empty ratio are calculated separately according to the aforesaid expression or expressions. In this example, both the buffer full ratio and buffer empty ratio shall have the same value for brevity's sake).

A start address "00000" is set in the start address register 12, and an end address "0FFFF" is set in the end address register 13.

When a Read command is executed in the above state, the process is such that: first, the interface control unit 3 disconnects a host interface (conforming to the SCSI standards) under the control of the MPU 8, and then starts transferring data read from the storage medium within the drive 10 to the data buffer 4 for storage.

Thereafter, the interface control unit starts a reconnection by using the host interface under the control of the MPU 8 so as to transfer data to the host 1 according to the timing that an amount of data stored in the data buffer 4 reaches a value meeting the buffer full ratio of 75%.

After a reconnection process is completed, data transfer to or from the host 1 is started under the control of the data buffer control unit 6 (data buffer-to-host data transfer is started). Thereafter, reading data from the storage medium within the drive 10 is completed. Data transfer to or from the host 1 is then completed.

When a Write command is executed, the process is such that: after receiving a Write command, the MPU 8 analyzes the command; and then as soon as the MPU identifies a Write command, the MPU 8 starts transferring write data from the host 1 (host-to-data buffer data transfer is started). At this time, storing data transferred from the host 1 in the data buffer 4 is started.

Thereafter, when a segment buffer becomes full of the write data during the host-to-data buffer data transfer, the interface control unit 3 executes disconnection of the host interface (conforming to the SCSI standards) under the control of the MPU 8. At this time, the drive 10 is executing a head positioning process for preparation of writing.

The head positioning process is duly completed. Data transfer from the data buffer 4 to the drive 10 is started, and writing in the storage medium within the drive 10 is started. The interface control unit 3 then starts a reconnection by using the host interface (conforming to the SCSI standards) under the control of the MPU 8 so as to receive data from the host 1 according to the timing that an amount of data stored in the data buffer 4 reaches a value meeting the specified buffer empty ratio of 75%.

After a reconnection process is thus completed, data transfer to or from the host 1 is started. In this case, data transfer between the data buffer and host is started. Thereafter, data transfer to or from the host 1 is completed, and then writing data in the storage medium within the drive 10 is completed.

Figure 13:
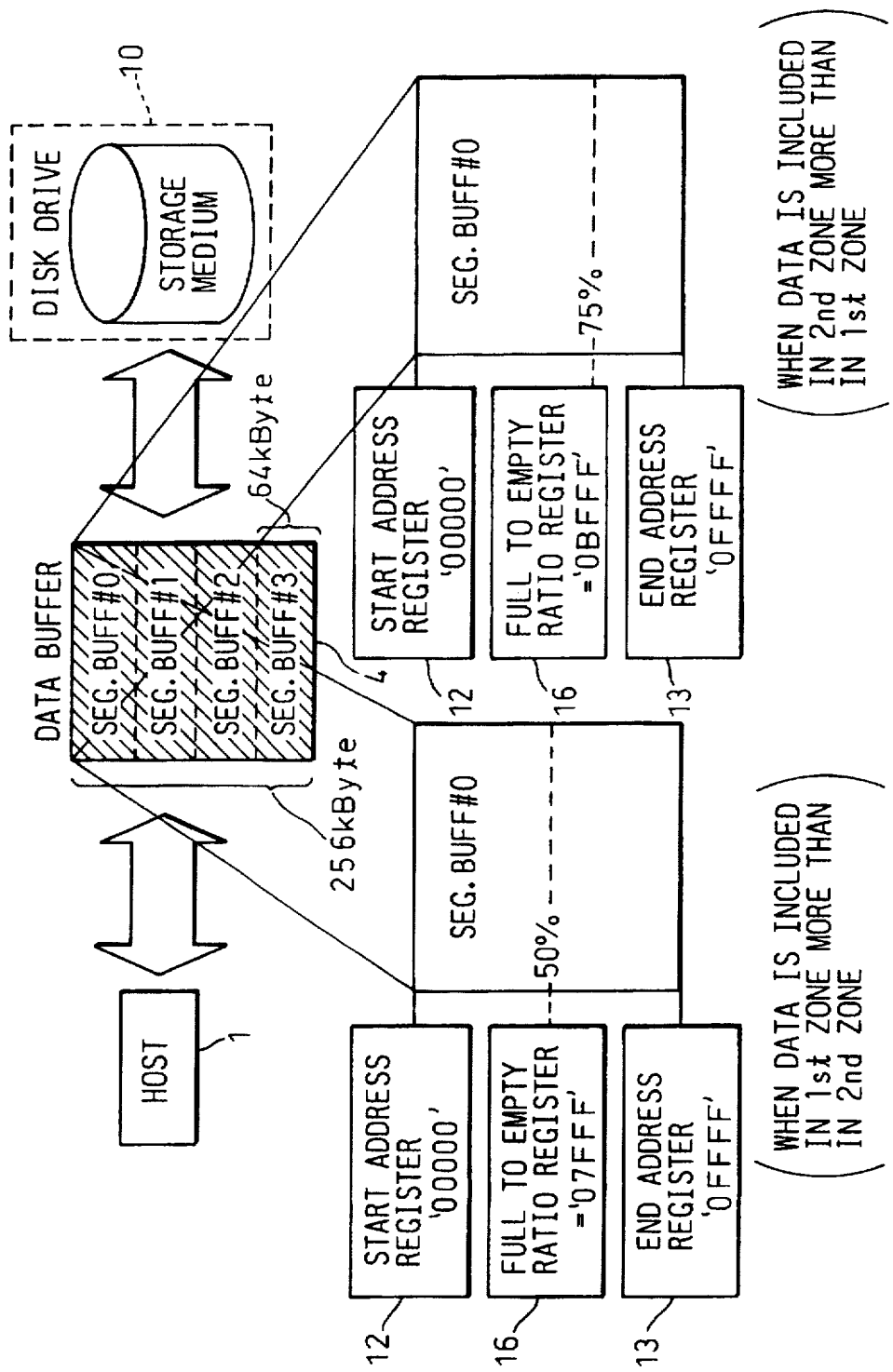
FIG. 13 is a diagram for explaining an operation employed in a second preferred embodiment of the present invention.

FIG. 13 is a diagram for explaining the operations of the second preferred embodiment of the present invention. The configuration of a magnetic disk unit is identical to that shown in FIG. 7. The description of the configuration will therefore be omitted.

In the second embodiment, when an amount of data (number of transfer blocks) requested by a Read or Write command resides over different zones, the same process as that of the first embodiment is performed on one zone containing a majority of the requested data.

Similarly to the aforesaid first embodiment, in this embodiment, when receiving a command issued from the host 1, the MPU 8 analyzes the contents of the command. When the command is a Read or Write command, comparison is performed in order to determine to which zone (zone of a storage medium) the data requested by the command belongs.

When it is found, as a result, that the requested data resides over several zones, it is determined which zone includes the requested data to the greatest extent. The same process as that in the aforesaid first embodiment is performed on the zone containing a majority of the requested data.

In this case, it is possible to detect the zone concerned using only the leading block of requested data. However, when the requested data resides over different zones and includes data of a subsequent zone to a great extent, detecting a zone using only the leading block of requested data does not permit optimal setting.

It is then determined which zone includes the data to the greatest extent. Setting is then made according to the zone containing a majority of the requested data. Thus, an optimal buffer full ratio or buffer empty ratio can be set in compliance with any request for data. Which zone includes requested data can be determined according to the following expression:

(last number of zone containing leading block of requested data)−(leading block number of requested data) ≧(last block number of requested data)−(leading number of zone containing last block of requested data)

Assuming that the last number of a zone containing the leading block of requested data is A, the leading block number of the requested data is B, the last block number of the requested data is C, and the leading number of a zone containing the last block of the requested data is D, the above expression, according to which a zone containing a majority of requested data is determined, is rewritten as A−B≧C−D.

For example, when the number of blocks constituting requested data is 10, A equals to 50,000, B equals to 49,997, C equals to 50,007, and D equals to 50,001, A−B that is 50,000 minus 49,997 comes to 3, and C−D that is 50,007 minus 50,001 comes to 6. The condition A−B≧C−D is not therefore satisfied.

In this case, optimal setting is made for the second zone containing the last block of the requested data. For example, as illustrated, when a majority of the requested data is contained in the first zone, a value in the full to empty ratio register is "07FFF" (=50%). When the majority of the requested data is contained in the second zone, the value in the full to empty ratio register is "0BFFF" (=75%). The process, which is to be performed with execution of a Read or Write command, is identical to that in the first embodiment.

Figure 14:
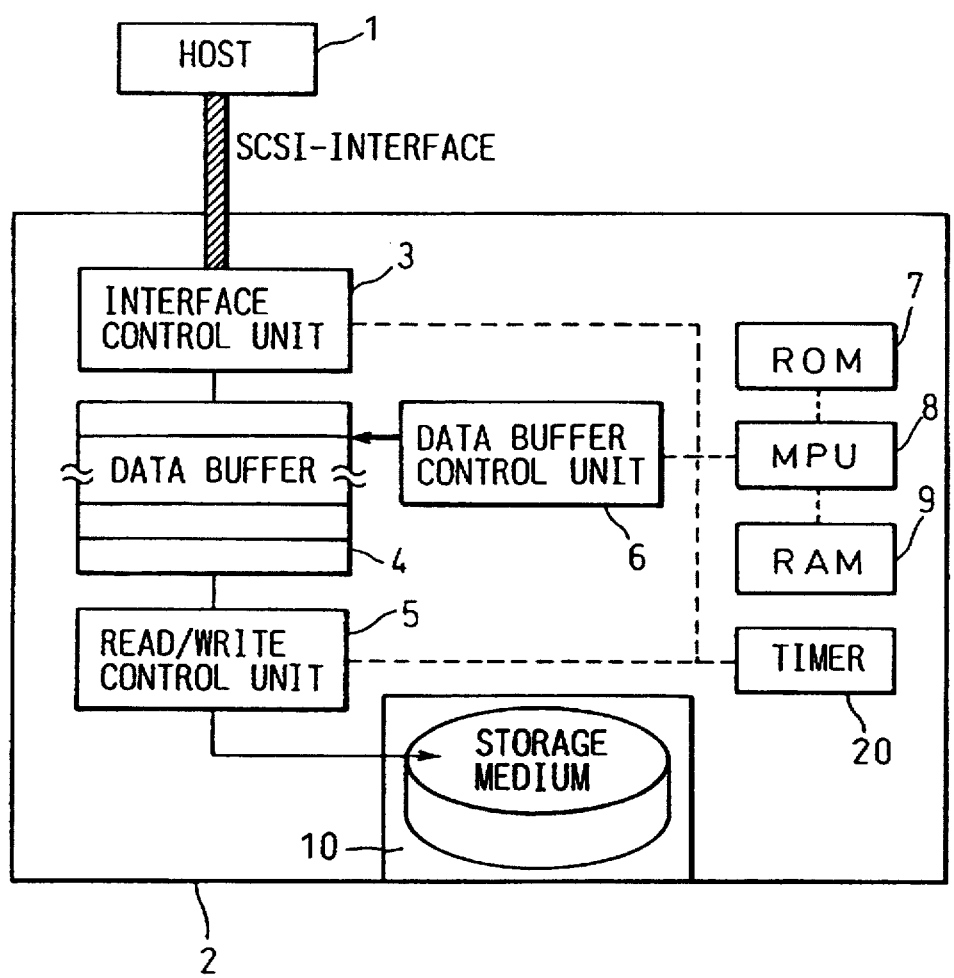
FIG. 14 is a block diagram showing the configuration of a device of a third preferred embodiment of the present invention.

FIG. 14 is a block diagram showing the configuration of a storage device of the third preferred embodiment of the present invention. The configuration of a magnetic disk unit is identical to that shown in FIG. 3. The description of the configuration will therefore be omitted.

In the third embodiment, a data transfer rate (SCSI-conformable transfer rate) between a host and a magnetic disk unit is measured at every reception of a command, and compared with an internal medium transfer rate. An optimal buffer full ratio or buffer empty ratio is set automatically, and then a reconnection of a bus is started according to the set value.

Section 1

Description of the configuration of a magnetic disk unit of the third embodiment (See FIG. 14)

FIG. 14 is a diagram showing the configuration of a storage device of the third embodiment. As illustrated, a magnetic disk unit 2 comprises an interface control unit 3, data buffer 4, read/write control unit 5, data buffer control unit 6, ROM 7, MPU 8, RAM 9, timer 20, drive 10, and the like.

The data buffer control unit 6 includes, similarly to that shown in FIG. 7, a start address register, end address register, host pointer, drive pointer, full to empty ratio register, and the like. These components are not shown.

During operation, the magnetic disk unit 2 is connected to the host 1. In this case, the host 1 and interface control unit 3 are linked by an SCSI-conformable cable.

The timer 20 is used to measure a data transfer rate (SCSI-conformable transfer rate) between the host and the magnetic disk unit under the control of the MPU 8. For example, the MPU 8 starts the timer 20 at the start of data transfer and stops the timer 20 at the end of the data transfer. Thus, the time required for data transfer can be measured.

A data transfer rate can be calculated using the measured time and an amount of transfer data (number of bytes). The components except for the timer 20 are identical to those in the unit shown in FIG. 3. The description of the components will therefore be omitted.

Section 2

Description of process employed in the third embodiment

In the third embodiment, the MPU 8 uses the timer 20 to measure a data transfer rate (SCSI-conformable data transfer rate) between the host and the magnetic disk unit. Even when the SCSI-conformable data transfer rate is varied (for example, a host is replaced with another), an optimal buffer full ratio or buffer empty ratio is set automatically.

In the above process, first, the MPU 8 starts the timer 20 when data transfer is started by the host 1, stops the timer 20 at the end of the data transfer, and thus measures a data transfer time.

Assuming that the SCSI-conformable data transfer rate is V, the SCSI-conformable data transfer rate is calculated according to the expression V=(number of transfer bytes)/(time required for data transfer)(unit: Mbps). Thereafter, the SCSI-conformable data transfer rate is used to calculate an optimal buffer full ratio or buffer empty ratio according to the expression or expressions described in the first embodiment.

The general expression giving a buffer full ratio is (amount of transfer data/effective transfer rate of disk)× (BFR/256)≦(amount of transfer data/effective transfer rate of disk)−(amount of transfer rate/SCSI-conformable transfer rate)−(time necessary for reconnection). The newly calculated value is assigned as the SCSI-conformable data transfer rate to this expression, thus calculating a buffer full ratio. The other values are identical to those in the first embodiment.

The general expressions giving a buffer empty ratio are X≦ effective transfer rate of disk x {(logical data block length/SCSI-conformable data transfer rate)+(time necessary for reconnection)} and BER ≦256−1X/2561. The newly calculated value is assigned as the SCSI-conformable data transfer rate to the expression, thus calculating a buffer full ratio. The other values are identical to those in the first embodiment.

As mentioned above, an optimal buffer full ratio or buffer empty ratio is set automatically. When a buffer full ratio or buffer empty ratio is not appropriate, SCSI-conformable data transfer or medium transfer is suspended before the completion of the transfer.

If such an event occurs, the MPU 8 counts the frequency of suspended data transfer and stores the count value in the RAM 9. When the suspended transfer frequency exceeds a certain threshold, the buffer full ratio or buffer empty ratio set in the full to empty ratio register in the data buffer control unit 6 is finely adjusted.

In this case, the MPU 8 increments or decrements the value of the buffer full ratio or buffer empty ratio set in the full to empty ratio register in the unit of, for example, 1%, and sets it to a value not causing data transfer to suspend. Owing to this process, to whatever extent the SCSI-conformable data transfer rate is varied, data transfer can be achieved efficiently.

The fourth preferred embodiment of the present invention is an embodiment in which a data transfer rate (SCSI-conformable data transfer rate) between the host and magnetic disk unit is compared with an internal medium transfer rate in the same manner as that in the third embodiment, and when the medium transfer rate is higher, 0 is set for a buffer full ratio or buffer empty ratio in order to maximize the data transfer rate.

In the fourth embodiment, a data transfer rate between the host 1 and magnetic disk unit is compared with an internal medium transfer rate at every reception of a command. When the medium transfer rate is higher, a buffer full ratio or buffer empty ratio is set to 0 in order to maximize the data transfer rate.

Normally, when the medium transfer rate is higher, SCSI-conformable data transfer will not suspend during a period from the start of the data transfer to the end thereof. By transferring transfer data from the medium to the host as fast as possible, the time elapsing from the start of a command to the end thereof can be minimized.

When even a small value is set for a buffer full ratio or buffer empty ratio, SCSI-conformable data transfer is delayed by a time required until an amount of data meeting the ratio of the value has been read. This becomes a factor of extending the time passing by the end of a command.

In the aforesaid process, when the medium transfer rate is higher, a command can be executed with the time passing by the end of a command minimized.

[Another Embodiments]

Some typical embodiments have been described so far. Alternatively, the present invention can also be embodied as mentioned below.

(1) The present invention can apply not only to a magnetic disk unit, but also any other disk unit such as a magneto-optical disk unit.

(2) The present invention can apply not only to a disk unit having a CDR-type storage medium described in the aforesaid preferred embodiment, but also to any other disk unit. However, larger effects can be exerted especially from a unit in which a reading or writing velocity varies depending on a zone of a storage medium; such as, a CDR-type magnetic disk unit.

As mentioned above, according to an embodiment of the present invention, the effects described below are expected [(1) and (2)].

(1) Since an optimal value of a parameter for use in controlling each segment buffer can be automatically set internally, an excellent device performance can be fully attained.

In the prior art, a "default value" set at the factory before delivery or a "current value" designated by a customer at a host has been set unilaterally for a buffer full ratio or buffer empty ratio.

After being determined, the value usually remains unchanged. Even if an effort is made to increase the storage capacity of a data buffer, no effect is exerted and an excellent product performance cannot be fully attained. At worst, an error such as a data overrun or data underrun occurs. This incurs the possibility that a disk rotation wait may be induced to deteriorate the device performance of retaining data transfer at high speed.

However, according to the present invention, an optimal value can be set automatically all the time. The excellent product performance can therefore be fully attained. Consequently, the error such as a data overrun or data underrun will not occur. It will not take place that a disk rotation wait state is induced to deteriorate the device performance.

(2) With an increase in storage capacity of a data buffer, the data buffer is not controlled on the basis of a unique value all the time but can be set to an appropriate value in conformity with a data transfer rate, a frequency of access, or a magnitude of access. An excellent product performance can therefore be fully attained.

According to the first embodiment of the present invention, in addition to the aforesaid effects, the following effects are exerted [(1) to (7)]:

(1) A control unit detects on the basis of a received Read or Write command whether or not an internal reading or writing velocity for a storage medium is changed from one value to another value according to a zone of the storage medium. When detecting that the velocity is changed, the control unit calculates an optimal buffer full ratio or buffer empty ratio suitable for the velocity and sets the ratio internally.

Thus, since an optimal value of a parameter for use in controlling each segment buffer can be automatically set internally, an excellent device performance can be fully attained.

(2) An MPU detects on the basis of a received Read or Write command whether or not an internal reading or writing velocity is changed from one value to another value according to a zone of a storage medium. When detecting that the velocity is changed, the MPU calculates an optimal buffer full ratio or buffer empty ratio suitable for the velocity and sets the ratio internally.

Thus, since an optimal value of a parameter for use in controlling each segment buffer can be automatically set internally, an excellent device performance can be fully attained. Even when a medium transfer rate is varied depending on a zone, an optimal buffer full ratio or buffer empty ratio can be set for efficient data transfer.

(3) An MPU determines whether or not data requested by a received Read or Write command resides over different zones in a storage medium. When the requested data resides over different zones, the MPU calculates one zone containing a majority of the requested data, works out an optimal buffer full ratio or buffer empty ratio according to a medium transfer ratio associated with the zone, and sets the value of the ratio in a data buffer control unit.

Thus, even when data requested by a Read or Write command resides over different zones in a storage medium, an optimal value of a parameter for use in controlling each segment buffer can be automatically set internally. An excellent device performance can therefore be fully attained all the time.

(4) An MPU measures a data transfer rate between a host and the external storage device at every reception of a command, compares the rate with an internal medium transfer rate, calculates an optimal buffer full ratio or buffer empty ratio according to a variation of the data transfer rate between the host and the external storage device, and then sets the value of the ratio in a data buffer control unit.

Thus, to whatever extent the data transfer rate (SCSI-conformable transfer rate) between the host and the external storage device is varied, an optimal value of a parameter for use in controlling each segment buffer can be set automatically internally. An excellent device performance can be fully attained all the time.

(5) An MPU compares a data transfer rate between a host and the external storage device with an internal medium transfer rate. When the medium transfer rate is higher, the MPU specifies zero for a buffer full ratio or buffer empty ratio, and sets zero in a data buffer control unit.

Thus, when the medium transfer rate is higher, a command can be executed with the time elapsing by the end of the command being minimized.

(6) A storage medium within a drive is a storage medium adopting a CDR mode in which the whole recording area of a storage medium is divided into a plurality of zones in a radial direction and the recording bit density per zone is made constant for recording.

A medium transfer time is varied depending on a zone of a storage medium. Even in a device having this kind of storage medium, owing to the aforesaid configuration, an optimal value of a parameter for use in controlling each segment buffer can be set automatically internally. An excellent device performance can therefore be fully attained all the time.

(7) A control unit detects, on the basis of a received Read or Write command, whether or not an internal reading or writing velocity for a storage medium is changed from one value to another value. When detecting that the velocity is changed, the control unit calculates an optimal buffer full ratio or buffer empty ratio suitable for the velocity and sets the ratio internally.

Thus, an optimal value of a parameter for use in controlling each segment buffer can be set automatically internally. An excellent device performance can therefore be fully attained all the time.

We claim:

1. An external storage device, comprising:
a control unit for controlling said device internally;
a drive for reading or writing data from or to a storage medium; and
a data buffer for temporarily storing data to be transferred between a host and said storage medium;
said control unit setting a value of a buffer full ratio or buffer empty ratio used to determine the timing of starting a reconnection by using a host interface, and starting a reconnection on the basis of said set value so as to duly start data transfer between said host and said external storage device;
wherein said control unit includes a means for detecting a change of a velocity of the drive and setting parameters that detects, on the basis of a received Read or Write command, whether or not an internal reading or writing velocity for said storage medium is changed from one value to another value, and that, when detecting that said velocity is changed, calculates an optimal buffer full ratio or buffer empty ratio suitable for said velocity and sets said ratio internally.

2. An external storage device according to claim 1, wherein said storage medium is a storage medium adopting a constant density recording mode in which the whole recording area of a storage medium is divided into a plurality of zones in a radial direction and the recording bit density per zone is made constant for recording.

3. An external storage device, comprising:
an MPU for controlling said device internally;
a drive for reading or writing data from or to a storage medium;
a data buffer for temporarily storing data to be transferred between a host and said storage medium; and
a data buffer control unit for controlling said data buffer;
said MPU setting data of a buffer full ratio or buffer empty ratio, which is used to determine the timing of starting a reconnection by using a host interface, in said data buffer control unit, and starting a reconnection on the basis of said set data so as to duly start data transfer between said host and said external storage device under the control of said data buffer control unit;
wherein said MPU includes a means for detecting a change of a velocity of the drive and setting parameters that detects, on the basis of a received Read or Write command, whether or not an internal reading or writing velocity is changed from one value to another value, and that, when detecting that said velocity is changed, calculates an optimal buffer full ratio or buffer empty ratio suitable for said velocity and sets said ratio in said data buffer control unit.

4. An external storage -device according to claim 3, wherein said storage medium is a storage medium adopting a constant density recording mode in which the whole recording area of a storage medium is divided into a plurality of zones in a radial direction and the recording bit density per zone is made constant for recording.

5. An external storage device, comprising:
an MPU for controlling said device internally;
a drive for reading or writing data from or to a storage medium;
a data buffer for temporarily storing data to be transferred between a host and said storage medium; and
a data buffer control unit for controlling said data buffer;
said MPU setting data of a buffer full ratio or buffer empty ratio, which is used to determine the timing of starting a reconnection by using a host interface, in said data buffer control unit, and starting a reconnection on the basis of said set data so as to duly start data transfer between said host and said external storage device under the control of said data buffer control unit;
wherein said MPU includes a means for determining a zone of the drive and setting parameters that determines whether or not data requested by a received Read or Write command resides over different zones in said storage medium, and that, when said data resides over different zones, calculates one zone containing a majority of said requested data, works out an optimal buffer full ratio or buffer empty ratio according to a medium transfer rate associated with said zone, and sets said ratio in said data buffer control unit.

6. An external storage device according to claim 5, wherein said storage medium is a storage medium adopting a constant density recording mode in which the whole recording area of a storage medium is divided into a plurality of zones in a radial direction and the recording bit density per zone is made constant for recording.

7. An external storage device, comprising:
an MPU for controlling said device internally;
a drive for reading or writing data from or to a storage medium;
a data buffer for temporarily storing data to be transferred between a host and said storage medium; and
a data buffer control unit for controlling said data buffer;
said MPU setting data of a buffer full ratio or buffer empty ratio, which is used to determine the timing of starting a reconnection by using a host interface, in said data buffer control unit, and starting a reconnection on the basis of said set data so as to duly start data transfer between said host and said external storage device under the control of said data buffer control unit;

wherein said MPU includes a means for measuring a data transfer rate and setting parameters that measures a data transfer rate between said host and said external storage device at every reception of a command, compares said data transfer rate with an internal medium transfer rate, calculates an optimal buffer full ratio or buffer empty ratio according to a variation of said data transfer rate between said host and said external storage device, and then sets said ratio in said data buffer control unit.

8. An external storage device according to claim 7, wherein said storage medium is a storage medium adopting a constant density recording mode in which the whole recording area of a storage medium is divided into a plurality of zones in a radial direction and the recording bit density per zone is made constant for recording.

9. An external storage device, comprising:

an MPU for controlling said device internally;

a drive for reading or writing data from or to a storage medium;

a data buffer for temporarily storing data to be transferred between a host and said storage medium; and a data buffer control unit for controlling said data buffer;

said MPU setting data of a buffer full ratio or buffer empty ratio, which is used to determine the timing of starting a reconnection by using a host interface, in said data buffer control unit, and starting a reconnection on the basis of said set data so as to duly start data transfer between said host and said external storage device under the control of said data buffer control unit;

wherein said MPU includes a means for comparing a data transfer rate with a medium transfer rate and setting parameters that compares a data transfer rate between said host and said external storage device with an internal medium transfer rate, and that, when said medium transfer rate is higher, specifies zero for said buffer full ratio or buffer empty ratio and sets zero in said data buffer control unit.

10. An external storage device according to claim 9, wherein said storage medium is a storage medium adopting a constant density recording mode in which the whole recording area of a storage medium is divided into a plurality of zones in a radial direction and the recording bit density per zone is made constant for recording.

11. An external storage control device having a control unit for controlling said device internally;

said control unit setting a value of a buffer full ratio or buffer empty ratio used to determine the timing of starting a reconnection by using a host interface, and starting a reconnection on the basis of said set value so as to duly start data transfer between a host and said external storage device;

wherein said control unit includes a means for detecting a change of a velocity and setting parameters that detects, on the basis of a received Read or Write command, whether or not a reading or writing velocity for a storage medium set in internal portions of said external storage device is changed from one value to another value, and that, when detecting that said velocity is changed, calculates an optimal buffer full ratio or buffer empty ratio suitable for said velocity and sets said ratio internally.

* * * * *